United States Patent [19]
Card et al.

[11] Patent Number: 5,979,557
[45] Date of Patent: *Nov. 9, 1999

[54] METHODS FOR LIMITING THE INFLOW OF FORMATION WATER AND FOR STIMULATING SUBTERRANEAN FORMATIONS

[75] Inventors: Roger J. Card, Sugar Land; J. Ernest Brown, Katy; Palathinkara S. Vinod, Houston; Dean M. Willberg, Sugar Land; Mathew M. Samuel, Longview; Frank F. Chang, Sugar Land, all of Tex.

[73] Assignee: Schlumberger Technology Corporation, Sugar Land, Tex.

[ * ] Notice: This patent is subject to a terminal disclaimer.

[21] Appl. No.: 08/865,137

[22] Filed: May 29, 1997

Related U.S. Application Data

[63] Continuation-in-part of application No. 08/727,877, Oct. 9, 1996.
[51] Int. Cl.$^6$ ............ E21B 43/27; E21B 33/00; C09K 3/00
[52] U.S. Cl. ............ 166/300; 507/240; 166/285
[58] Field of Search .................... 507/211, 925; 166/285, 300

[56] References Cited

U.S. PATENT DOCUMENTS

| | | | |
|---|---|---|---|
| 3,760,881 | 9/1973 | Kiel .......................... | 166/308 |
| 3,954,629 | 5/1976 | Scheffel et al. ............ | 507/118 |
| 4,061,580 | 12/1977 | Jahnke ................... | 252/8.55 R |
| 4,148,736 | 4/1979 | Meister ...................... | 507/103 |
| 4,192,753 | 3/1980 | Pye et al. .................. | 507/103 |
| 4,532,052 | 7/1985 | Weaver et al. ............. | 507/222 |

(List continued on next page.)

OTHER PUBLICATIONS

X. Li et al., "Polymer–Induced Microstructural Transitions in Surfactant Solutions," J. Phys. Chem., vol. 99, No. 27, pp. 10865–10878 (1995).

(List continued on next page.)

*Primary Examiner*—C. H. Kelly
*Attorney, Agent, or Firm*—Douglas Y'Barbo

[57] ABSTRACT

A method is provided for limiting the inflow of formation water during a well turn around to maximize polymer recovery after a hydraulic fracturing treatment of a formation. The method includes a step for selectively blocking the pore structure in a water-bearing zone and not blocking the pore structure of a hydrocarbon zone at the formation face; performing a hydraulic fracturing treatment using a fluid having a polymer; and turning the well around to recover the polymer. There is also provided a method of acidizing, preferably matrix acidizing, a formation having a hydrocarbon zone and a water-bearing zone. The method includes a step for selectively blocking the pore structure in the water-bearing zone at the formation face to selectively retard migration of acid into the water-bearing zone; and injecting acid into the formation, wherein the acid is diverted from the water-bearing zone to the hydrocarbon zone as a result of the selective blocking step. When the water-bearing zone contains a residual amount of hydrocarbon residues, the method further includes injecting a mutual solvent prior to the step for selectively blocking.

In these methods, the step for selectively blocking preferably forms a plug of a viscous fluid in the pore structure of the water-bearing zone at the formation face. The viscous fluid preferably has at least a viscoelastic surfactant capable of forming a worm-like micelle in an aqueous environment, a water-soluble salt to effect formation stability, and an aqueous carrier fluid.

22 Claims, 9 Drawing Sheets

U.S. PATENT DOCUMENTS

| | | | |
|---|---|---|---|
| 4,615,389 | 10/1986 | Teot et al. | 252/356 |
| 4,695,389 | 9/1987 | Kubala | 252/8.553 |
| 4,725,372 | 2/1988 | Teot et al. | 252/8.514 |
| 4,735,731 | 4/1988 | Rose et al. | 252/8.51 |
| 4,975,482 | 12/1990 | Peiffer | 524/535 |
| 5,036,136 | 7/1991 | Peiffer | 524/812 |
| 5,093,448 | 3/1992 | Peiffer | 526/310 |
| 5,101,903 | 4/1992 | Llave et al. | 166/294 |
| 5,203,411 | 4/1993 | Dawe et al. | 166/274 |
| 5,258,137 | 11/1993 | Bonekamp et al. | 252/356 |
| 5,310,002 | 5/1994 | Blauch et al. | 507/923 |
| 5,551,516 | 9/1996 | Norman et al. | 166/308 |

OTHER PUBLICATIONS

Z. Lin et al., Cryogenic Electron Microscopy of Rodlike or Wormlike Micelles in Aqueous Solutions of Nonionic Surfactant (1992).

Hexaethylene Glycol Monohexadecyl Ether, Langmuir, vol. 8, No. 9, pp. 2200–2205 (1992).

D. Pope et al., "Field Study of Guar Removal from Hydraulic Fractures," SPE 31094, pp. 239–245 (1995).

K. Armstrong et al, "Advanced Fracturing Fluids Improve Well Economics," Oilfield Review, vol. 7, No. 3, pp. 34–51 (1995).

B. Gadiyar et al., "Experimental Study and Modeling of Hydraulic Fracturing Fluid Leakoff in Presence of Gas Saturation," SPE 35635, pp. 549–558 (1996).

G.W. Hawkins, "Laboratory Study of Proppant–Pack Permeability Reduction Caused by Fracturing Fluids Concentrated During Closure," SPE 18261, pp. 787–800 (1988).

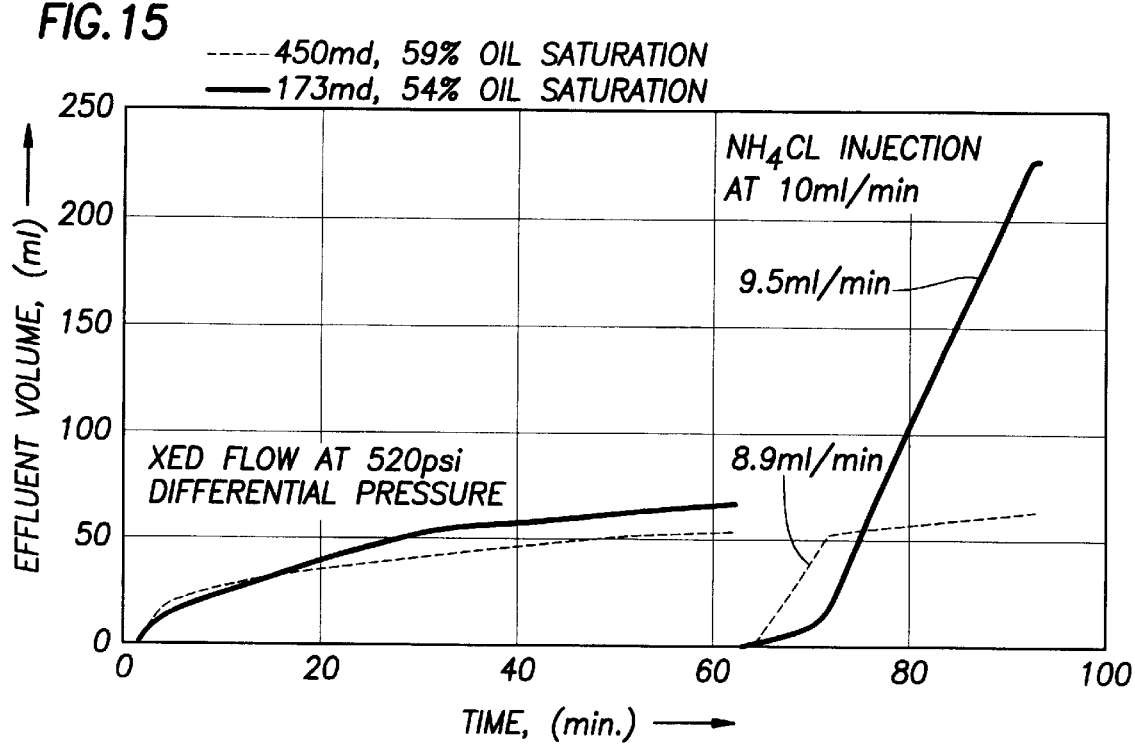
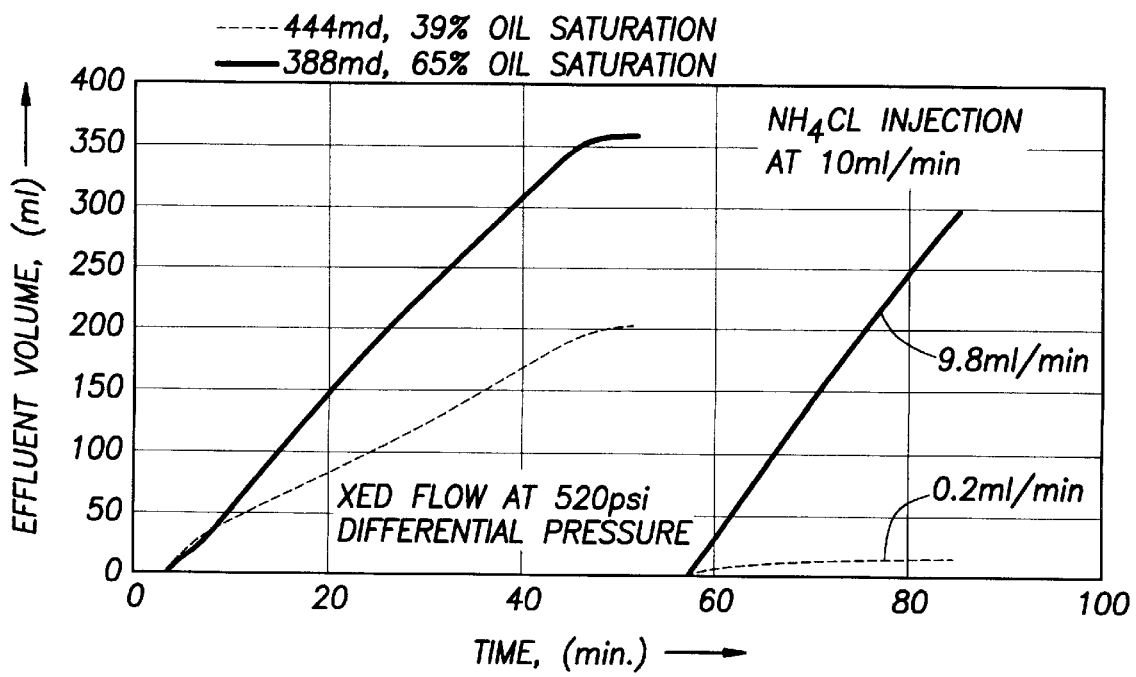

METHODS FOR LIMITING THE INFLOW OF FORMATION WATER AND FOR STIMULATING SUBTERRANEAN FORMATIONS

RELATED APPLICATION

This application is a continuation-in-part of U.S. patent application Ser. No. 08/727,877, entitled Methods of Fracturing Subterranean Formations, filed Oct. 9, 1996, which is hereby incorporated by reference in its entirety.

FIELD OF THE INVENTION

This invention relates to the recovery of hydrocarbons from subterranean formations. More particularly, the invention relates to novel methods of limiting the inflow of formation water and to novel methods of stimulating subterranean formations, e.g., by acidizing and/or fracturing, to increase hydrocarbon production and diverting stimulation fluids away from water rich zones, thereby limiting stimulation loss into such water rich zones.

BACKGROUND OF THE INVENTION

In the recovery of hydrocarbons from subterranean formations, particularly in such formations wherein the wellbore also traverses water-bearing zones, the desire is to facilitate the movement of hydrocarbons to the wellbore so that the hydrocarbons may be pumped from the well. At the same time, there is a corresponding desire to limit the movement of formation water into the wellbore and production thereof. In order to enhance the effectiveness of some of these methods for increasing (or stimulating) hydrocarbon production, the proper placement of stimulation fluids, for example, acidizing and/or fracturing fluids, at the hydrocarbon zones and minimizing the loss thereof into the water zones is desirable.

Acidizing is used to stimulate hydrocarbon production from a well. There are two types of acidizing treatments: (1) matrix acidizing and (2) fracture acidizing with the difference between them relating to injection rates and pressures. Fracture acidizing is acidizing at injection rates above fracture pressure. Fracture acidizing is used for creating cracks or fractures in the formation to increase the available flow area and thereby increase well productivity. Acidizing at injection rates below fracture pressure is termed matrix acidizing. Matrix acidizing is primarily used for damage removal and to restore the permeability to original reservoir permeability or higher. The damage is primarily skin damage caused by drilling, completion and workover fluids and precipitation of deposits from produced water or oil (such as scale). Removal of severe plugging in carbonate and sandstone formations can result in very large increases in well productivity. Oil well flow behavior is greatly affected by the geometry of radial flow into the wellbore. The pressure gradient, for example, psi per foot, is proportional to the flow velocity and is very small at large distances from the wellbore. At points close to the wellbore, the flow area is much smaller and the flowing pressure gradient is much higher. Because of this small flow area, any damage to the formation close to the wellbore, say within 20 feet thereof and sometimes within as little as 3 feet therefrom, may be the cause most of the total pressure draw down during production and thereby dominate well performance.

Since the acidizing fluids do not discriminate between hydrocarbon and water bearing zones, an undesired result may be obtained wherein the production of formation water is increased. Thus, there is a need to direct acidizing fluids away from water bearing zones and preferably also limit the amount of formation water produced once the well is "turn around."

Further, at the end of a conventional hydraulic fracturing operation, it is necessary to bring back to the surface as much as possible of the hydraulic fluid components such as polymer, typically a galactomannan polysaccharide, broken polymer components, salts, typically ammonium chloride, potassium chloride and tetramethyl ammonium chloride, and fluid, typically a brine, pumped into the formation during treatment. This process of bringing the fluid back to the surface after the treatment is termed "turning the well around". This process lasts from the moment fluid is begun to be brought back until the gas or oil is produced in sufficient quantities for sale. The well turn around process can last from hours to several days. During this period, it has historically been possible to recover approximately one third of the polymer and fluid pumped during the hydraulic fracturing treatment.

In the case of low permeability (less than about 1 md) dry gas reservoirs (that is, gas reservoirs which produce hydrocarbons and little or no formation water), it is possible to dramatically improve the recovery of polymer and fluid during the well turnaround period by increasing the rate at which the fluids are brought back to the surface. This has been documented in two published field studies. SPE 31094 (D. Pope, L. Britt, V. Constien, A. Anderson, L. Leung, "Field Study of Guar Removal from Hydraulic Fractures: presented at the SPE International Symposium on Formation Damage Control, Lafayette, La., Feb. 14–15, 1995) provided the first demonstration that increased flowback rate results in increased polymer recovery which results in increased well productivity. This was taken further in SPE 36468 (A. J. Anderson, P. J. N. Ashton, J. Lang and M. L. Samuelson, "Production Enhancement Through Aggressive Flowback Procedures in the Codell Formation" presented at the SPE Annual Technical Conference and Exhibition, Denver, Co., Oct. 6–9, 1997) where polymer recovery was increased to more than 60% of the amount pumped during the treatment and 90 day cumulative production was increased by more than 50% over those of offset wells with less aggressive flowback rates. Similar results have been observed in other low permeability dry gas wells. (See, for example, SPE 30495, P. R. Howard, M. T. King, M. Morris, J. P. Feraud, G. Slusher, S. Lipari, "Fiber/Proppant Mixtures Control Proppant Flowback in South Texas" presented at the SPE Annual Technical Conference and Exhibition, Dallas, Tex., Oct. 22–25, 1995.)

The flowback pattern from this type of formation is very distinctive. This is illustrated in FIG. 1. This figure presents a graph of the concentration of the polymer, in this case guar, in samples of fluid flowed back to the surface after the hydraulic fracturing treatment of a dry gas well as a function of the time between the start of the flowback and when the sample was collected. The concentration of polymer in these samples is equal to or greater than the concentration of guar pumped during the treatment and is relatively constant over time. This behavior continues for months after the turn around period is over and the well is in production.

However, in recent studies relating to oil wells, we have discovered and demonstrated that the inflow of formation water during the well turn around period is detrimental to the ability to maximize the polymer recovered after a hydraulic fracturing treatment of a gas or oil well and to efforts to maximize well productivity. As a result, we have identified that there is a need to control the inflow of this formation water during the well turn around stage in order to be able to maximize well productivity.

SUMMARY OF THE INVENTION

Satisfying this newly identified need, the present invention provides a method of limiting the inflow of formation water during and after a well turn around to maximize recovery of the fracturing fluid and components thereof after a hydraulic fracturing treatment of a formation having a hydrocarbon zone and a water-bearing zone, the method comprising:

step for selectively blocking the pore structure in the water-bearing zone at the formation face and not blocking the pore structure of the hydrocarbon zone at the formation face;

performing a hydraulic fracturing treatment using a fluid capable of transporting a proppant into a fracture; and turning the well around to recover the fluid and component, thereof.

The term "water-bearing zone" means any portion of the formation that is capable of producing water during the turn around period. Accordingly, the term "water-bearing zone" includes a hydrocarbon-bearing zone that has a sufficiently high water saturation such that the water is mobile and produced during the turn around period.

The components of the fluid being recovered include the polymer, typically a galactomannan polysaccharide, broken polymer or polymer fragments and monomers thereof, salts, typically ammonium chloride, potassium chloride and tetramethyl ammonium chloride, and fluid, typically a brine. The proppant carried by the fracturing fluid substantially remains in the fracture created during the fracturing process.

Preferably, the step for selectively blocking forms a plug of a viscous fluid in the pore structure of the water-bearing zone at the formation face. In a preferred embodiment, the viscous fluid has at least (1) a viscoelastic surfactant capable of forming a worm-like micelle in an aqueous environment, (2) a water-soluble salt to effect formation stability, particularly clay stability, and an aqueous carrier fluid in which the viscoelastic surfactant forms the worm-like micelles. The viscoelastic surfactant is preferably selected from the group consisting of:

(a) an amine having to the formula

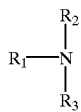

(b) an amine salt having the formula

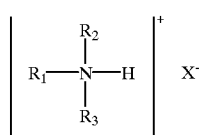

and (c) a quaternary ammonium salt having the formula

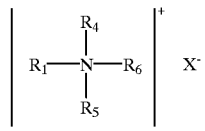

wherein $R_1$ is an aliphatic group having at least 16 carbon atoms which may be branched or straight chained and which may be saturated or unsaturated, $R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6- member ring which includes the nitrogen atom to which they are attached, $R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6- member ring which includes the nitrogen atom to which they are attached, and $X^-$ is an anion.

The anion may be an organic or inorganic anion.

In another embodiment, the viscous fluid is a water control material. Preferably, the water control material is selected from the group consisting of a crosslinked cationic polyacrylamide, a crosslinked hydroxyethylcellulose, polymers and copolymers of N-vinyl amides, and chromium crosslinked carboxylate-containing polymers.

In another aspect of the present invention, there is provided a method of acidizing, preferably matrix acidizing, a formation having a hydrocarbon zone and a water-bearing zone, the method comprising:

step for selectively blocking the pore structure in the water-bearing zone at the formation face to selectively retard migration of acid into the water-bearing zone and allow migration into the hydrocarbon zone; and injecting acid into the formation, wherein the acid is diverted from the water-bearing zone to the hydrocarbon zone as a result of selectively blocking the pore structure in the water-bearing zone at the formation face.

When the water-bearing zone contains a residual amount of hydrocarbon residues, the method further comprises injecting a mutual solvent prior to the step for selectively blocking. The mutual solvent is preferably selected from the group consisting of low molecular weight esters, ethers and alcohols, and more preferably, the mutual solvent is a low molecular weight ether, for example, ethylene glycol monobutyl ether.

Preferably, the step for selectively blocking forms a plug of a viscous fluid in the pore structure of the water-bearing zone at the formation face. The viscous fluid preferably has at least (1) a viscoelastic surfactant capable of forming a worm-like micelle in an aqueous environment, (2) a water-soluble salt to effect formation stability, and (3) an aqueous carrier fluid in which the viscoelastic surfactant forms the worm-like micelles. The viscoelastic surfactant is preferably selected from the group consisting of:

(a) an amine having to the formula

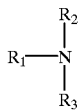

(b) an amine salt having the formula

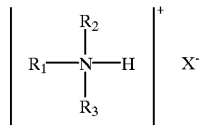

and (c) a quaternary ammonium salt having the formula

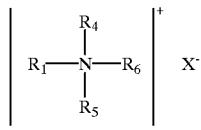

wherein $R_1$ is an aliphatic group having at least 16 carbon atoms which may be branched or straight chained and which may be saturated or unsaturated, $R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6- member ring which includes the nitrogen atom to which they are attached, $R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6- member ring which includes the nitrogen atom to which they are attached, and $X^-$ is an anion.

The anion may be an organic or inorganic anion.

In another embodiment, the viscous fluid is a water control material selected from the group consisting of a crosslinked cationic polyacrylamide, a crosslinked hydroxyethylcellulose, polymers and copolymers of N-vinyl amides, and chromium crosslinked carboxylate-containing polymers.

Figure 11:
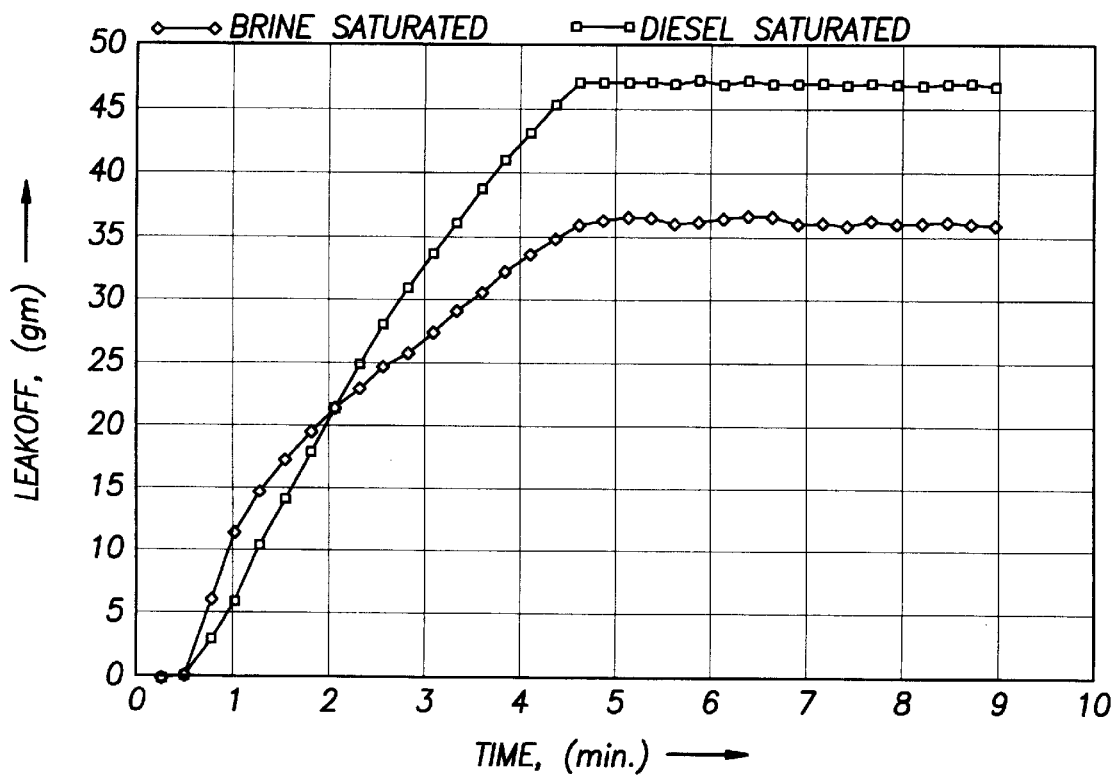
FIG. 11 presents a graph of another single parallel leakoff test in brine and diesel saturated cores. The brine contained 2% KCl. The viscoelastic fluid was like that used in FIGS. 7a and 7b, except the aqueous fluid containing the QAS was present at 5% also in a 2% KCl brine. The cores were 6 inches long, rather than 12 inches long, and maintained at 150° F. The fluid pressure was 500 psi.
Figure 12:
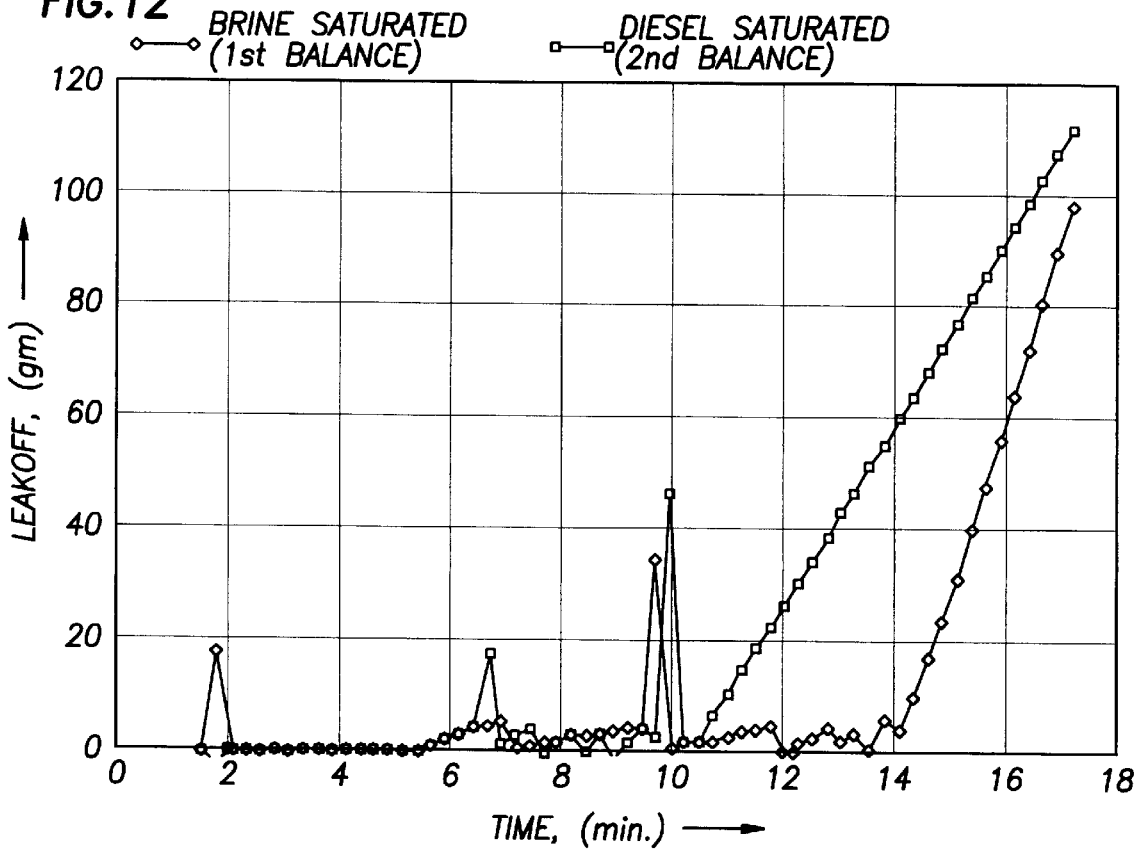

FIG. 12 presents a graph of the brine leakoff through a brine saturated core and a diesel saturated core after the leakoff test referenced in FIG. 11. The brine had 2% KCl and also 2% $NaNO_3$ (as a tag).

Figure 7A:
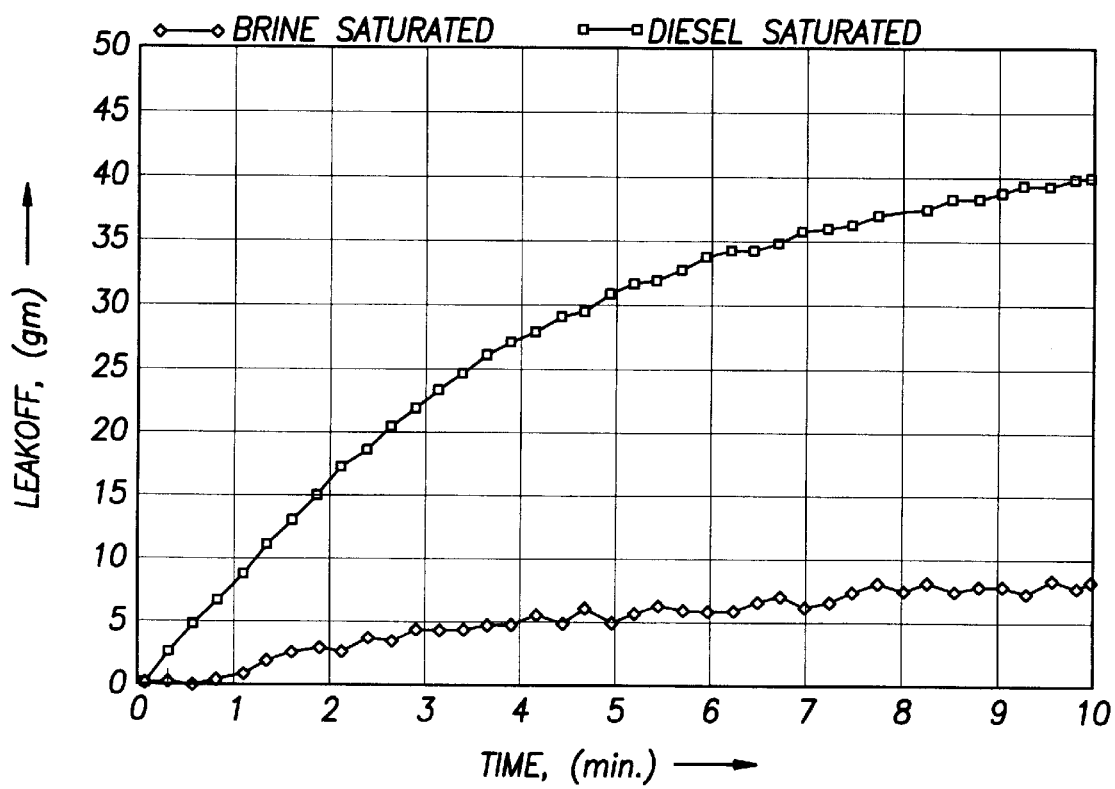
FIGS. 7a and 7b present graphs of a single parallel leakoff test in brine and diesel saturated cores showing initial behavior (FIG. 7a) and long term behavior (FIG. 7b). The brine contained 2% KCl. The viscoelastic fluid was an aqueous fluid containing (1) 4% of a blend of 25% isopropyl alcohol and 75% quaternary ammonium salt (QAS), N-cis-12-docosenoic-N,N-bis (2-hydroxyethyl)-N-methyl ammonium chloride, in (2) a 2% KCl brine. The cores were berea sandstone cores having a permeability of 60 millidarcies (mD), 12 inches long and maintained at a temperature of 150° F. The fluid pressure was 1500 psi.
Figure 7B:
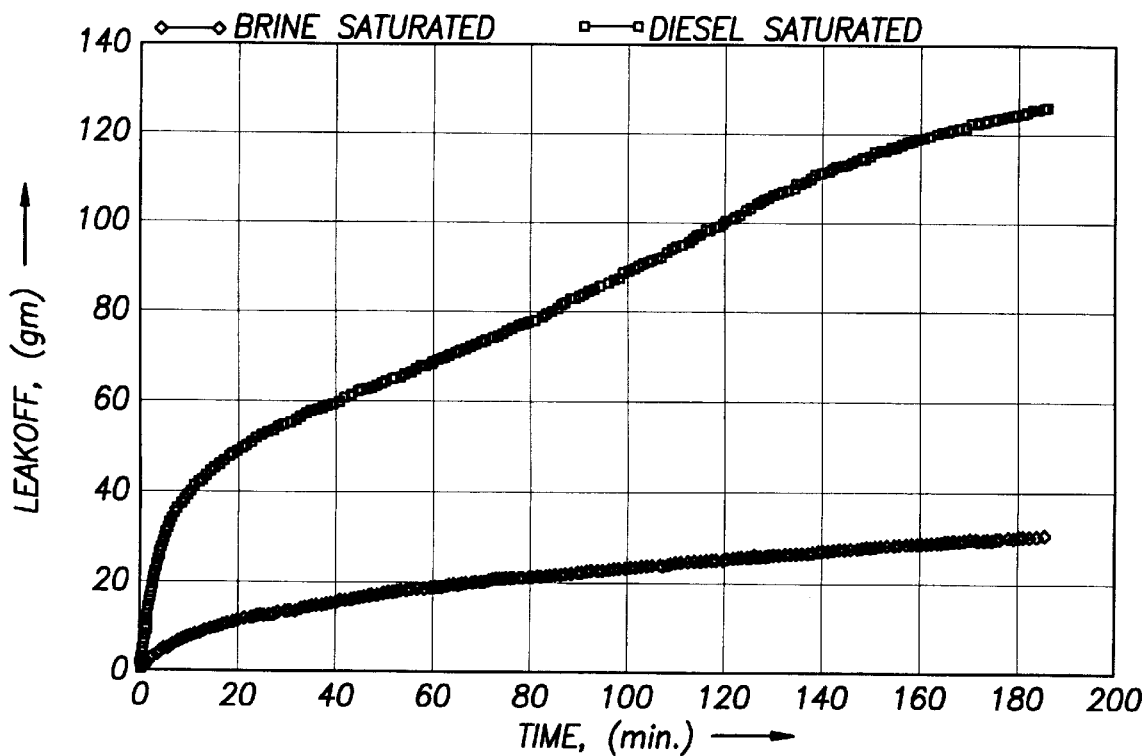
Figure 13:
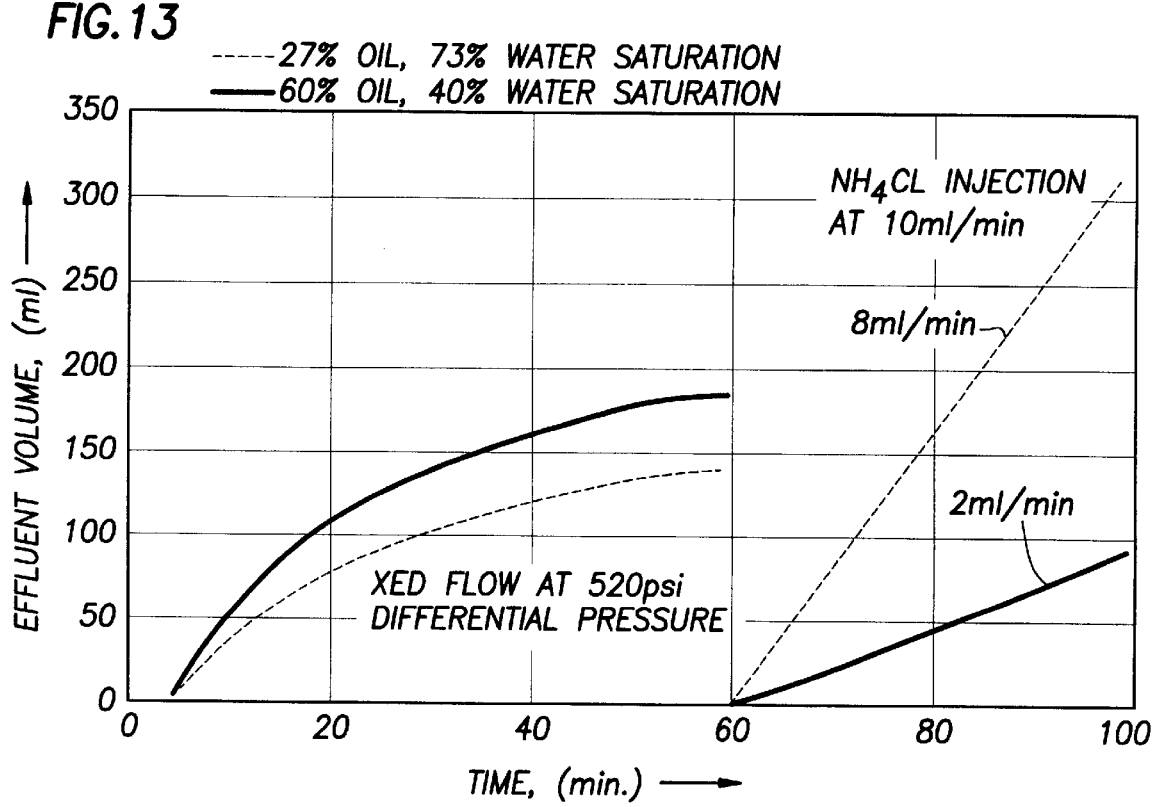

FIG. 13 presents a graph showing the effect of diversion using an aqueous fluid as used in FIGS. 7a and 7b at 4%, but in a 3% $NH_4Cl$ brine followed by a 3% $NH_4Cl$ brine to simulate acidizing. One core had a 27% oil/73% water saturation and the other had a 60% oil/40% water saturation.

Figure 14:
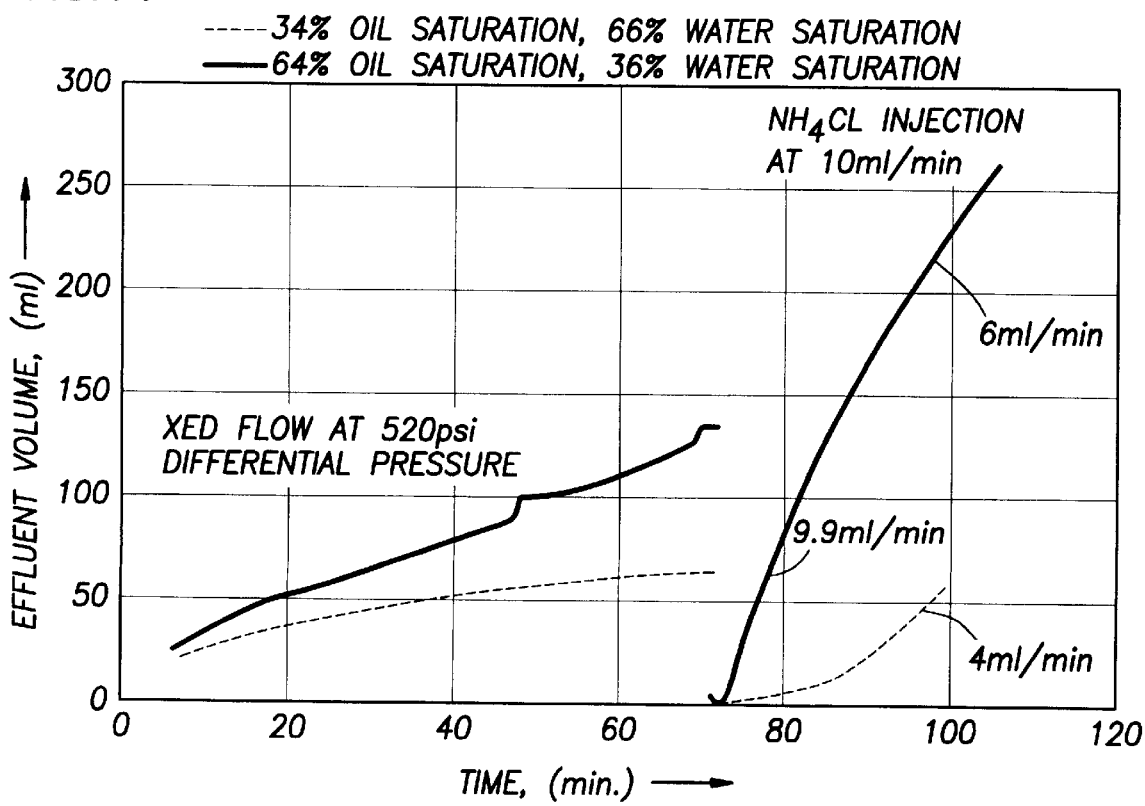

FIG. 14 presents a graph showing the effect of diversion using the same fluids as referenced in regards to FIG. 13, but where the cores were preflushed by a mutual solvent in a 3% $NH_4Cl$ brine.

FIG. 15 presents a graph showing the effect of diversion into lower permeability rock (450 mD and 59% oil saturation vs. 173 mD and 54% oil saturation) using the same fluids and preflush composition referred to in regards to FIG. 14.

FIG. 16 presents a graph showing the effect of diversion using the same aqueous fluid used in FIG. 15, but followed by a 15% HCl brine and using the same preflush composition referred to in regards to FIG. 14. The cores were maintained at 190° F., instead of 150° F.

DETAILED DESCRIPTION OF THE INVENTION

Figure 1:
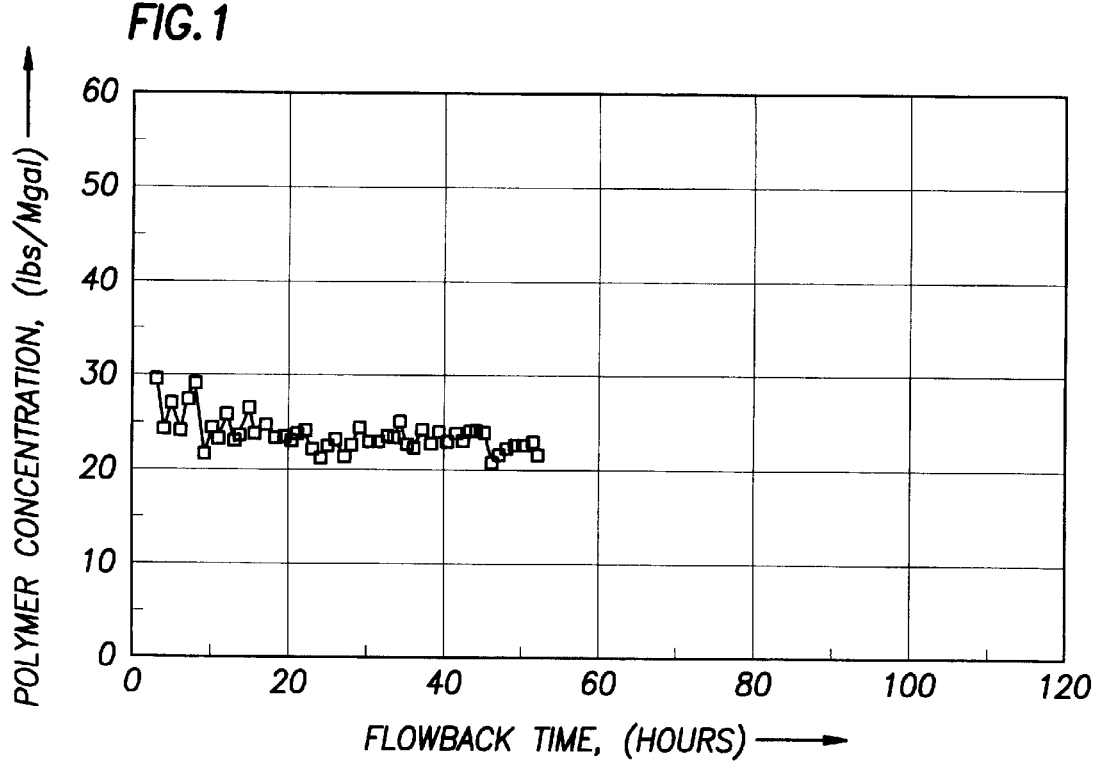
FIG. 1 presents a graph of the concentration of guar (1 bm/1000 gallons) in the samples of fluid flowed back to the surface after a prior art hydraulic fracturing treatment of a dry gas well as a function of the time (hours) between the start of the flowback and when the sample was collected.
Figure 2:
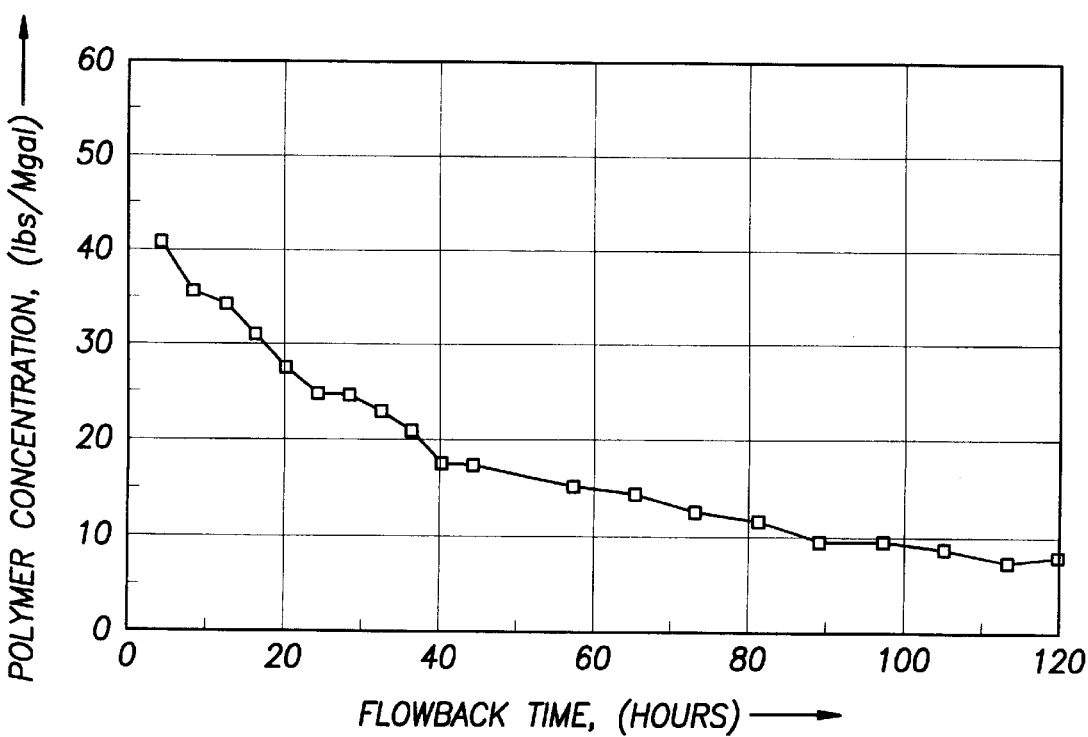
FIG. 2 presents a graph of the concentration of guar (1 bm/1000 gallons) in the samples of fluid flowed back to the surface after a prior art hydraulic fracturing treatment of a gas well producing formation water as a function of the time (hours) between the start of the flowback and when the sample was collected.
Figure 3:
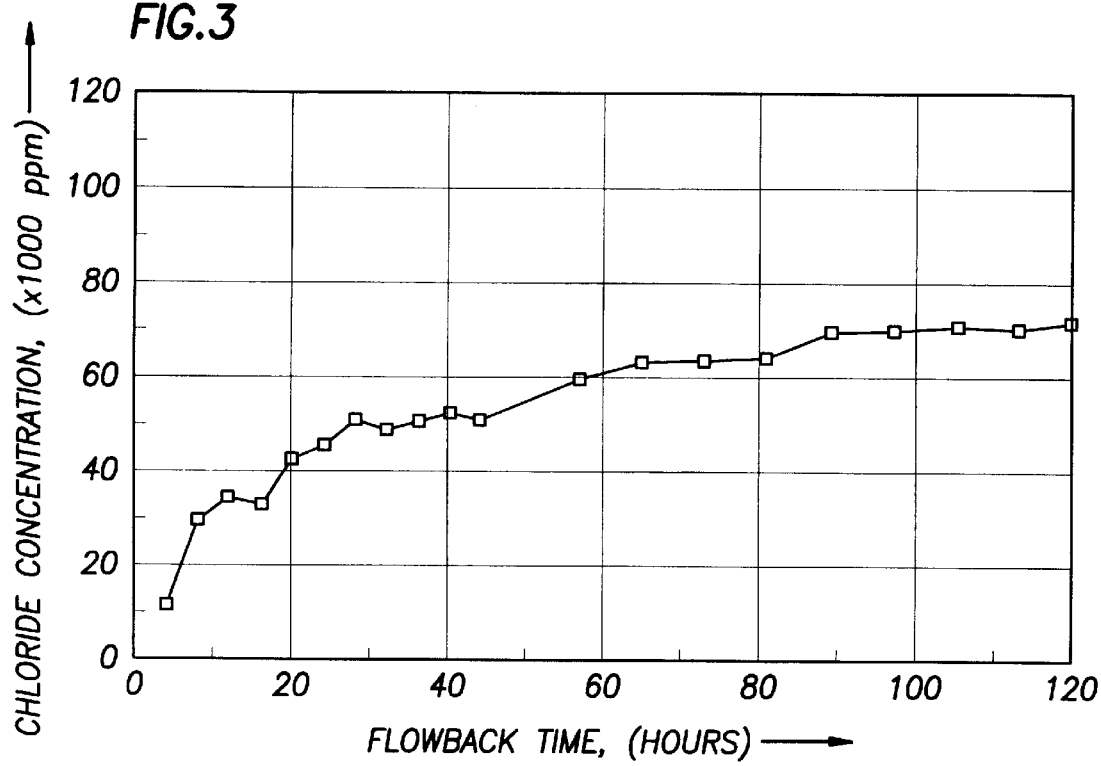
FIG. 3 presents a graph of chloride concentration (×1000 ppm) in the samples of fluid flowed back to the surface after the prior art hydraulic fracturing treatment of the gas well producing formation water referred to in FIG. 2 as a function of the time (hours) between the start of the flowback and when the sample was collected.
Figure 4:
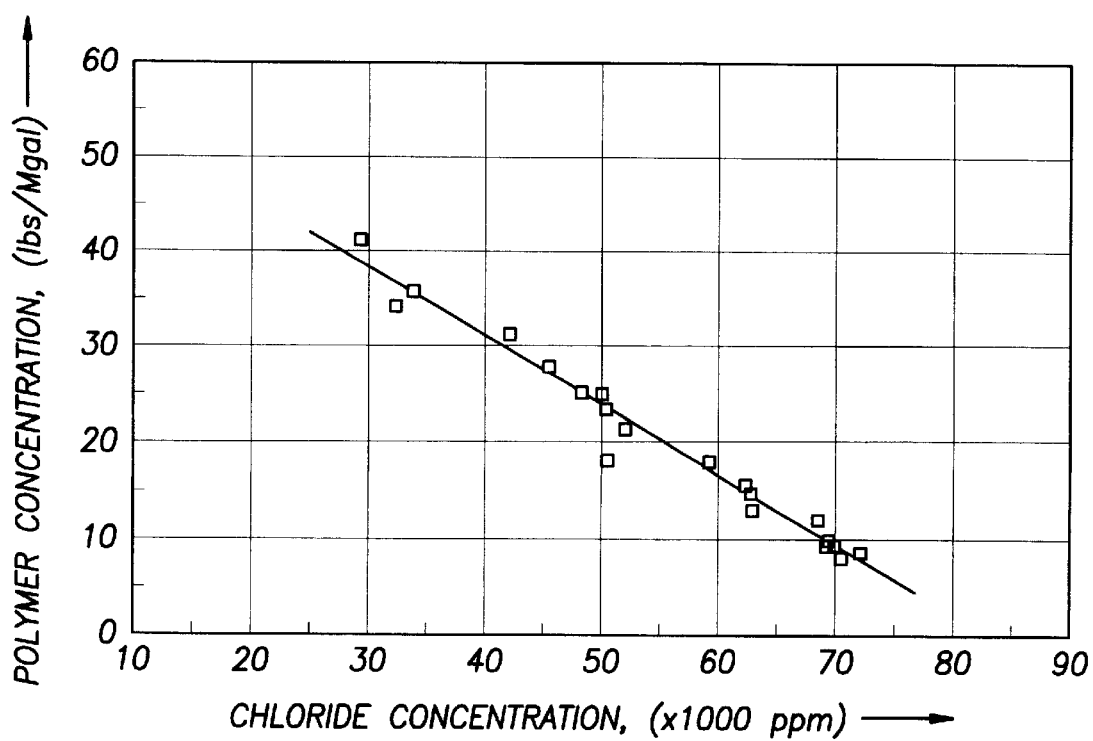
FIG. 4 presents a graph of guar concentration (1 bm/1000 gallons) versus chloride concentration (×1000 ppm) in the flowback sample for the hydraulic fracture of the gas well corresponding to FIGS. 2 and 3.
Figure 5:
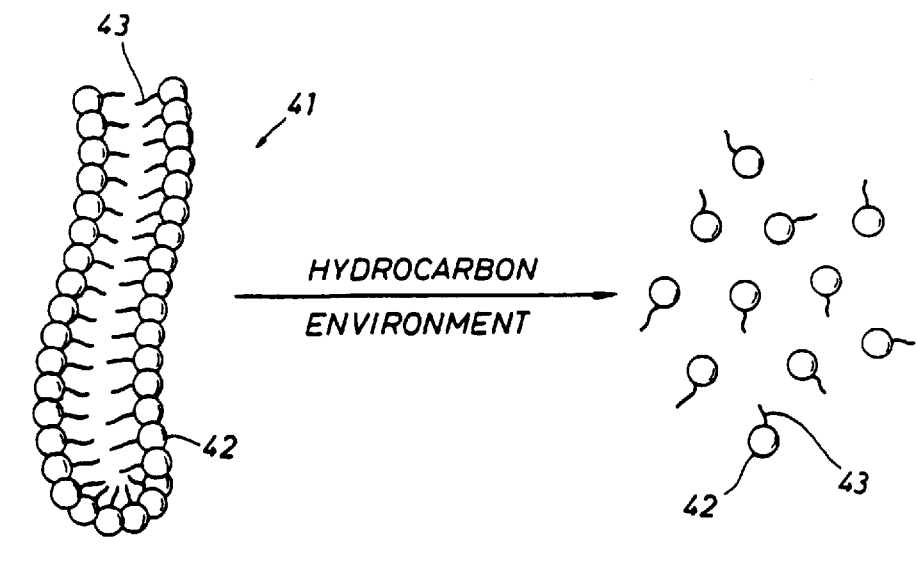
In FIG. 5, a micelle of surfactant is shown in a typical configuration with hydrophilic head portions 42 and hydrophobic tail portions 43. The hydrophilic portions, when in an aqueous (polar) environment, tend to form an outer layer, while the hydrophobic portions are directed inwards away from the aqueous environment. In the presence of sufficient amount of hydrocarbons, this wormlike micellar structure becomes unstable, reverting to a micellar structure that is not conducive to forming a viscous fluid, or to individual molecules as shown in the figure.

We have recently discovered that the trend of aggressive flowback to enhance polymer recovery after a hydraulic fracture operation of a dry gas well is not observed in reservoirs, either oil or gas, in which formation water is produced. In such reservoirs, we found that aggressive flow back procedures did not substantially increase the amount of polymer recovered nor well productivity. We determined the cause of this behavior by analyzing data from samples obtained during the flowback period. In contrast to the pattern seen for dry gas reservoirs, polymer concentration rapidly decreased during the flowback period for these wells. This is illustrated by the data in FIG. 2. This is a graph of guar concentration in the flowback samples as a function of time. Polymer concentration started off near the level of the polymer pumped on the job for the hydraulic fracture operation and then rapidly decreased to approach zero in 5 to 6 days. Additional analysis showed that production of formation water quickly dominated over the production of water from the original fracturing fluid. This is illustrated in FIG. 3 which presents a graph of chloride concentration in the flowback samples with time. If only fracturing fluid were produced, this should have stayed constant at about 5000 parts per million. Instead, there was a rapid rise in chloride level until it reached the level of chloride in the formation. Thus, production of formation water quickly dominated over the production of fracturing water. This limited the amount of polymer which could be recovered during the clean up period and, will ultimately greatly restrict well productivity. FIG. 4 provides further evidence of this. This is a plot of guar concentration versus chloride concentration in the flowback samples. As the chloride concentration increased, the polymer concentration decreased until it approached zero. Thus, we discovered that there is a heretofore unrecognized need for a method to limit the inflow of formation water during the well turn around period, and optionally long into the life of the well, in order to maximize the polymer recovery and well productivity.

The present invention provides a step for selectively blocking the pore structure in water-bearing zones but not in oil or gas zones to selectively retard production of formation water. The processes incorporating this step can be used to treat the entire length of the conventional fracture if desired, although limitation of water production from as little as about the 10% of the fracture length nearest to the wellbore can be effective. It is always preferred that the area of the fracture nearest the wellbore be treated. This step, when used in a conventional hydraulic fracture process, also reduces treatment fluid loss to the water-bearing zones, and in an aggressive flow back increases the recovery of the polymer used in the fracturing fluid.

In one embodiment, an aqueous viscoelastic surfactant system is pumped into the formation. This fluid would have a viscosity in excess of 10 cp, and preferably in excess of 35 cp, and more preferably from about 35cp to about 500cp, at 100 $sec^{-1}$ and bottom hole temperature. Since the fluid is water based, the mobility of the viscoelastic surfactant into the pores of the water-bearing zone is greater than the mobility of the viscoelastic surfactant into the oil or gas zone. In addition, the viscoelastic surfactant system retains its viscosity on exposure to formation water but loses its viscosity on exposure to hydrocarbons. As a result, a plug of viscous fluid is placed selectively in the pore structure of water-bearing zones at the formation face, but not in the pore structure of the hydrocarbon zones at the formation face. Thereafter, the fracturing treatment is performed. When the fracturing treatment is turned around, the production of formation water is selectively retarded by this plug of viscous fluid. The viscous plug may be temporary or permanent depending on the composition of the plug, the volume of the plug and reservoir conditions such as temperature and pressure.

The process may be conducted in a variety of ways. In one preferred embodiment, the viscoelastic fluid is used in the pad (that is, the fluid stage at the start of a hydraulic fracturing process prior to the pumping of the proppant-fluid slurry). In a further embodiment, the viscoelastic fluid is used as the carrying fluid for the proppant slurry during the normal hydraulic fracturing operation. In another embodiment, the viscous plug could be placed prior to the conventional hydraulic fracturing treatment, for example, as part of minifrac or calibration frac process.

In this embodiment of the present invention, the methods comprises employing an aqueous viscoelastic surfactant based fluid. The fluid comprises water, a salt and a viscoelastic surfactant capable of forming a wormlike micelle. Optionally, it may include a cosurfactant to increase viscosity or to minimize the formation of stable emulsions which contain components of crude oil or a polysaccharide or chemically modified polysaccharide, or an organic salt or alcohol, etc.

The surfactants create fluids which have a low leakoff rate. Preferably, these fluids are insensitive to pressure. At high pressures, even as high as used during a fracturing operation, little fluid is lost to the formation. This reduces the total volume of fluid needed to provide the desired formation treatment with associated cost savings. Further, since hydraulic fluid leakoff into water-bearing zones is minimized, longer fracture length extension is obtained using micellar-type viscoelastic surfactant fluids according to the present invention. At low pressures, these low molecular weight surfactant systems flow out of the oil or gas zones of the formation more easily with better cleanup—showing improved well productivity after fracturing.

Viscoelastic surfactants are relatively small molecules. Each molecule is typically less than 500 grams per mole, which is less than 0.1% the size of the polymers used in some of the prior art hydraulic fracturing methods. These small molecules will associate under certain conditions to form wormlike micelles in an equilibrium state of breaking and reforming. As dynamic structures, the micellar structure are readily altered by shear pressure, the presence of hydrocarbons, or sometimes by increased temperature. All of these features may be found in the hydrocarbon portion of the reservoir. The wormlike micelles rapidly assume a structure that is not conducive to creating viscosity and/or the surfactant molecules return to their original small independent state once they are placed into the hydrocarbon bearing zone.

Figure 6:
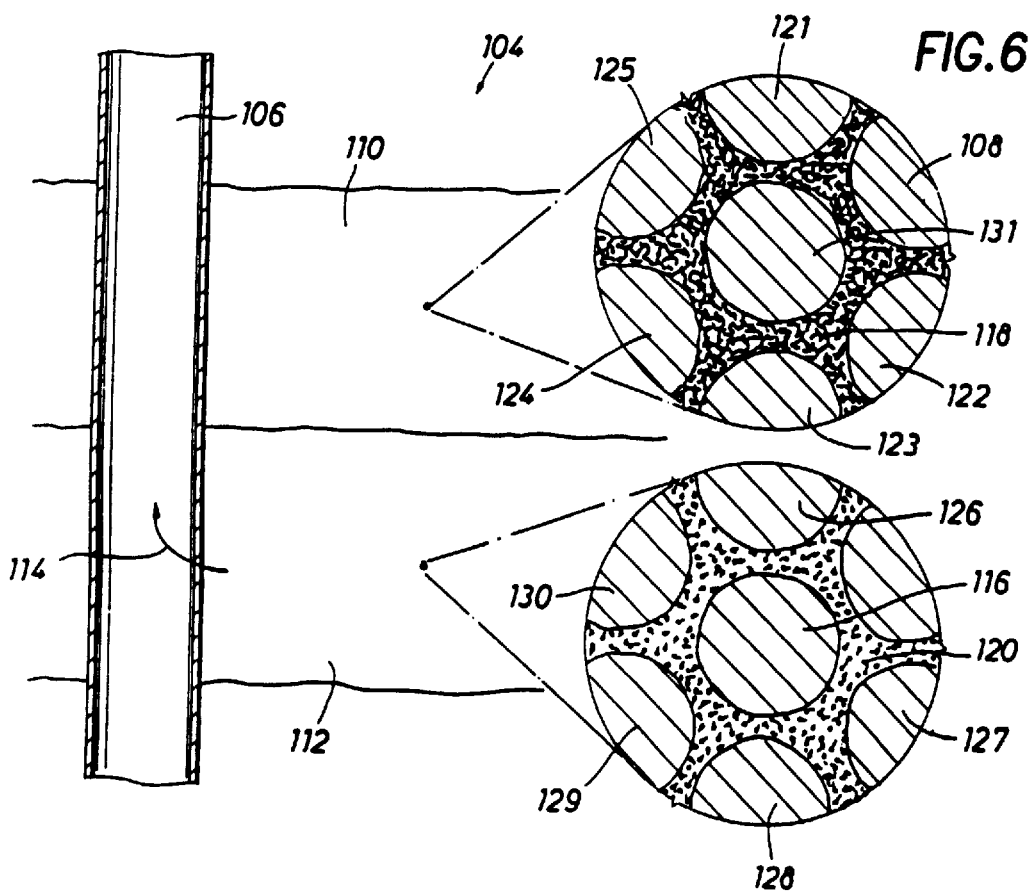
FIG. 6 depicts a subterranean formation 104 comprising an aqueous zone 110 separating a hydrocarbon zone 112. Wellbore 106 receives hydrocarbons along direction arrow 114 from the hydrocarbon zone 112. A close-up examination of the pore structure is seen for both the aqueous zone (upper) and hydrocarbon zone (lower). Sand grains 121, 122, 123, 124, 125, 108, 131, 126, 116, 127, 128, 129, 130, are shown in the formation. Wormlike micelles 118 are seen in the space between the sand grains in the aqueous zone as a network of micelles which impede formation or connate water flowback into the wellbore 106. The micelles within the hydrocarbon zone are dispersed into micellar subunits 120, as seen in the lower portion of FIG. 6.

To the contrary, the molecules pumped into the water-bearing zones of the formation advantageously remain behind in wormlike micellar form while in an aqueous environment, and act to block or impede the flow of water from the formation, as seen in FIG. 6. The micelles of this invention are preferably wormlike in shape, as opposed to other geometric shapes such as box shaped or spherical. They are circular or elliptical in cross-sectional area. Preferably, they are relatively long in comparison to their width, with an average aspect ratio of 100 or greater, in most cases.

Well treatment conditions allow wormlike micelles to form under surface conditions and remain stable while they are pumped down the wellbore, but then undergo a structural change or disband into individual components on exposure to hydrocarbons in the reservoir rock.

In addition to the viscoelastic surfactant, the aqueous treating fluid in accordance with the invention requires a sufficient quantity of at least one water soluble salt to effect formation stability. Typically, water soluble potassium and ammonium salts, such as potassium chloride, tetramethyl ammonium chloride and ammonium chloride are employed. Additionally, calcium chloride, calcium bromide, magnesium chloride and zinc halide salts may also be used. Other useful salts include aluminum salts, zirconium salts and the like. Formation stability and in particular clay stability is achieved at a concentration level of a few tenths of a percent to a few percent by weight, for example, tetramethyl ammonium chloride can be used at about 0.2 to about 0.5 percent by weight, and as such, the density of the fluid usually is not significantly altered by the presence of the salt. However, if fluid density becomes an important consideration, heavier salts may be employed.

In hydraulic fracturing applications, a sufficient quantity of at least one surfactant soluble in the aqueous salt solution is employed in the method of this invention to limit formation water production during turn around after a hydraulic fracture operation, wherein the surfactant is at least one member selected from the group consisting of:

(a) an amine having the formula

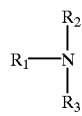

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic;

(b) an amine salt having the formula

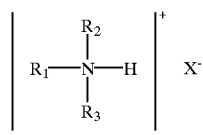

wherein $R_1$, $R_2$ and $R_3$ are the same as defined hereinbefore and $X^-$ is an inorganic anion, and;

(c) a quaternary ammonium salt having the formula

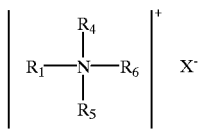

wherein $R_1$ and $X^-$ are the same as defined hereinbefore and $R_4$, $R_5$ and $R_6$ are each independently an aliphatic group containing from 1 to about 6 carbon atoms and the $R_2$ and $R_3$ groups of the amine salt and the $R_4$, $R_5$ and $R_6$ groups of the quaternary ammonium salt may be part of a heterocyclic 5- or 6-member ring structure which includes the nitrogen atom of the amine.

A sufficient quantity of a water soluble organic salt and/or alcohol may optionally be employed to provide desired viscoelastic properties under severe conditions. Preferably, the organic salt is a water soluble carboxylate salt such as sodium or potassium salicylate or the like. However, this salt is not required in all cases. Preferably, the alcohol is a cosurfactant, typically a $C_4$ to $C_{12}$ aliphatic alcohol.

The surfactant employed in the invention comprises at least one of the surfactants set forth herein. A mixture of two or more surfactants may be used.

In instances where the surfactant is an amine acid salt or a quaternary ammonium salt, the associated anion should be an inorganic anion. Preferably, $X^-$ is an inorganic anion such as a sulfate, nitrate, perchlorate or halide. A halide (Cl, Br or I) is preferred, Cl and Br being most preferred.

The optional organic salt constituent of the treatment fluid, when employed, is preferably a water soluble compound involving typically a sodium or potassium salt of an organic anion. The anion may be an aromatic organic anion such as a salicylate, naphthalene sulfonate, p- and m-chlorobenzoates, 3,5- and 3,4- and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5, 6-trichloropicolinate, 4-amino-3,5,6-trichloropicolinate, 2,4,-dichlorophenoxyacetate, toluene sulfonate, α,β-napthols, p.p'bisphenol A or cocoamidopropyl dimethyl amine oxide. The surfactant should be chosen such that the anion is compatible with the electrolyte present in the aqueous solution such that undesirable precipitates are not formed. Also the specific anion chosen will depend to some degree on the specific amine structure. In some applications, only organic salts may be present. While not wishing to be bound to any particular theory, some anionic species are required when quaternary ammonium salts are used to form worm-like micelles. The salt helps to neutralize the repulsive forces exhibited when two cationic species approach each other. Organic salts and inorganic salts do this in different ways. The inorganic salts tend to neutralize the charge by associating with the cationic surfactant on the outer surface of the worm-like micelle. The organic anions that are most effective tend to be incorporated as part of the micelle structure with hydrophobic portion of the organic anion lying inside worm-like micelle. Thus, the two species work differently and yield different properties. The choice of when to use either organic, inorganic or a mixture thereof depends on the properties desired. Organic anions tend to be required for higher temperature applications, for example, above about 175° F.

The exact quantity and specific surfactant or mixture of surfactants to be employed will vary depending on the concentration of and selection of specific soluble salt(s) employed to make up the solution, the viscosity desired, the temperature of use, the pH of the solution, and other similar factors.

The concentration of the surfactant can range from about 0.05 to about 8 percent by weight of the aqueous fluid. Laboratory procedures are employed to determine the optimum concentrations for any particular set of parameters. For example, when a non-protonated amine is employed as the surfactant, the pH of the aqueous fluid can change to some degree the effectiveness of particular amines. More acidic solutions are required for some amines to be completely dissolved. It is possible that this fact results because the amine may need to become protonated before it will become effectively dissolved in the fluid.

The viscoelastic surfactants are selected from a group of surfactant materials capable of forming the preferable wormlike micelles as opposed to typical surfactant materials which tend to form spherical micelles or sheet-like structures. Further, in order to be useful in the present invention, the selected surfactant must be able to form the wormlike micelles over a broad range of concentrations, such as 0.5 to about 8 percent, preferably from about 1 to about 6 percent, by weight in the aqueous fluid. The number of surfactant materials that can be successfully used in the invention decreases with increasing temperature.

The preferred thickener is erucyl bis(2-hydroxyethyl) methyl ammonium chloride. It is also known as N-cis-13-docosenoic-N,N-bis(2-hydroxyethyl)-N-methyl ammonium chloride and has the structure:

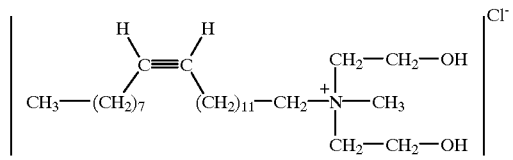

It is available from Akzo Noble Chemicals, Inc. Alternative thickeners may be employed either alone or in combination in accordance with the invention, including erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris (hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl-N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris (hydroxyethyl) ammonium bromide; hexadecyl ethyl bis (hydroxyethyl) ammonium chloride; hexadecyl isopropyl bis(hydroxyethyl) ammonium iodide; N,N-dihydroxypropyl hexadecyl amine, N-methyl-N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino-N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

To prepare the aqueous treatment fluid in accordance with the present invention, the surfactant is added to an aqueous solution in which has been dissolved a quantity of at least one water soluble salt. Standard mixing procedures known in the art can be employed since heating of the solution and special agitation conditions are normally not necessary. Of course, if used under conditions of extreme cold such as found in Alaska or Canada, normal heating procedures should be employed.

Sometimes it is preferable to dissolve the surfactant into a lower molecular weight alcohol prior to mixing it with the aqueous solution. The lower molecular weight alcohol or diol, for instance isopropanol or propylene glycol, may function to aid to solubilize the thickener. Other similar agents may also be employed. Further, a defoaming agent such as a polyglycol may be employed to prevent undesirable foaming during the preparation of the fracturing fluid.

In addition to the water soluble salts and surfactants described herein, the aqueous treatment fluid may contain other conventional constituents which perform specific desired functions, e.g., corrosion inhibitors, fluid-loss additives, and others as described previously herein, and the like.

In another embodiment, conventional water control polymers which selectively reduce water production can be used to block the inflow of formation water during the well turn around period. These materials would be pumped either as part of the pad on a conventional hydraulic fracturing operation or as a separate operation prior to performing the major hydraulic fracturing treatment. For example, the water control materials would be pumped under fracturing pressures in sufficient volume to create a fracture with a fracture length that is less than the fracture half length of conventional hydraulic fracture to follow. Typically, the "prefac" stage would create a fracture half length which is from about 5% to about 75% of the fracture length of the conventional fracturing treatment. The preferred length of the "prefac" is from about 10% to about 35% of the length of the following conventional fracturing treatment.

Water control materials are well known to those knowledgeable in the art. Examples of suitable water control materials include such materials as cationic polyacrylamides crosslinked with inorganic crosslinking agents as described in U.S. Pat. No. 5,125,456 (Hutchins and Dovan, Union Oil, Jun 30, 1992), hydroxethylcellulose crosslinked with a lanthanide crosslinking agent as described in U.S. Pat. No. 5,207,934 (Dovan and Hutchins, Union Oil, May 4, 1993), polymers comprising N-vinyl amides such as N-vinyl lactam as taught in U.S. Pat. No. 5,382,371 (Stahl et al., Phillips Petroleum, Jan. 17, 1995), carboxylate-containing polymers crosslinked with chromium species as taught in U.S. Pat. No. 5,010,594 (Falk, Marathon Oil Co., Apr. 30, 1991), which are hereby incorporated by reference.

In another aspect of the present invention, there is provided a treatment fluid and a method to enhance the effectiveness of acidizing treatments. The effectiveness of matrix acidizing treatments is often dictated by the ability to divert the acid into the areas where it can be most beneficial in opening up pore structures to the production of hydrocarbons. In many cases, acid will increase permeability in a small region. This makes it easier for sequential quantities of acid to follow this same higher permeability "path of least resistance". A number of techniques have been developed to divert acid away from higher permeability zones. These include foams, particulates or other additives designed to temporarily plug off areas most susceptible to fluid movement. These approaches are limited by the fact that they are indirect. What is truly needed is a means to divert acid out of water zones and into zones capable of producing hydrocarbons so that the permeability of the hydrocarbon zone can be increased preferentially over the permeability of the water zones.

A conventional acidizing treatment for a sandstone formation normally will involve sequentially injecting three fluids—a preflush, a hydrofluoric acid-hydrochloric acid mixture, and an afterflush. For a carbonate formation, a conventional acidizing treatment normally will involve sequential injection of at least two fluids—an acid (usually hydrochloric acid) and an after flush. A preflush may also be included.

Pursuant to the present invention, a step is added prior to the injection of the acid or prior to performing the acidizing method. The additional step is a step for selectively blocking the pore structure in water zones to selectively retard migration of acid into water zones and allow migration into oil or gas zones. As one example, an aqueous viscoelastic surfactant system could be pumped into the formation. This fluid would have a viscosity in excess of 10 cp, and preferably in excess of 35 cp, and more preferably from about 35 cp to about 500 cp at 100 sec$^{-1}$ and bottom hole temperature. Since it is a water-based fluid, the mobility of the viscoelastic surfactant into the pores of the water-bearing zone will be greater than the mobility of the viscoelastic surfactant into the oil or gas zone. In addition, the viscoelastic surfactant system retains its viscosity on exposure to formation water but loses its viscosity on exposure to hydrocarbons. As a result, a plug of viscous fluid is placed selectively in the pore structure of water-bearing zones at the formation face while in contact with formation water, but not in the pore structure of the hydrocarbon zones at the formation face. When acid is subsequently introduced into the formation, the acid will go preferentially into the hydrocarbon zone because movement into the water-bearing zone is selectively blocked by the high viscosity plug. The viscoelastic surfactants useful in the present invention are those previously identified herein. Alternatively, the water control materials such as previously disclosed herein are also useful herein.

In cases where there is a water-bearing zone which is substantially, but not completely, free of hydrocarbon residues, it may be advantageous to pump a sequence of fluids. The initial fluid would include a solvent capable of dissolving both water and crude oil, i.e., a mutual solvent. Such solvents include esters such as butyl acetate, ethyl acetate and the like; ethers such as tetrahydrofuran and low molecular weight glycol ethers, e.g., EGMBE; low molecular weight alcohols such as methanol, ethanol, propanol, isopropyl alcohol and the like; and similar materials. This could optionally be followed by a brine spacer fluid. The next fluid would be the viscoelastic surfactant, which is followed finally by the acid. These stages could be repeated as necessary during the treatment.

Productivity restrictions caused by oil wetting of formation and fines often can be removed by making the solids water wet. This may be done with surface-active materials provided they contact the solid surface and replace the agent making the surface oil wet. Unfortunately, most surface-active materials alone cannot cause the oil wetting agent to be desorbed. Some chemicals (such as the low molecular weight glycol ethers) can strip the oil wetting surfactant from the surface and leave it water wet. Ethylene glycol monobutyl ether (EGMBE) is often preferred for this application. When used at a concentration of 10 percent by volume in the afterflush, this material is most effective. Low molecular weight alcohols are sometimes used for this purpose, although they appear less effective than the glycol ethers. However, compatibility tests should be performed with acid, formation fluids, and formation solids to assure damage will not occur.

In the matrix acidizing of sandstone formations, the preflush is usually hydrochloric acid, ranging in concentration from 5 to 15 percent and containing a corrosion inhibitor and other additives as required. The preflush displaces water from the wellbore and formation, i.e., connate, water from the near-wellbore region, thereby minimizing direct contact between sodium and potassium ions in the formation brine and fluosilicate reaction products. Normally, this will eliminate redamaging the formation by precipitation of insoluble sodium or potassium fluosilicates. The acid also reacts with calcite (calcium carbonate) or other calcarious material in the formation, thereby reducing, or eliminating, reaction between the hydrofluoric acid and calcite. The preflush avoids waste of the more expensive hydrofluoric acid and prevents the formation of calcium fluoride, which can precipitate from a spent HF-HCl mixture.

The HF-HCl mixture (usually 3-percent HF and 12-percent HCl) then is injected. The BF reacts with clays, sand, drilling mud or cement filtrate to improve permeability near the wellbore. The HCl essentially will not react and is mainly present to keep the pH low, preventing precipitation of HF reaction products. Because the depth of permeability alteration is severely limited in HF-HCl treatments, a way to extend the action of acid deeper into the formation is to generate the HF acid in situ by injecting methyl formate and ammonium fluoride. Methyl formate hydrolyzes in the presence of formation water to produce formic acid, which then reacts with ammonium fluoride to yield hydrogen fluoride.

An afterflush is required to isolate the reacted HF from brine that may be used to flush the tubing and to restore water wettability to the formation and the insoluble-acid reaction products. Normally, in hydrocarbon producing wells, one of two types of afterflush is used: (1) for oil wells, either a hydrocarbon afterflush, such as diesel oil, or 15-percent HCl is used; and (2) for gas wells, either acid or a gas (such as nitrogen or natural gas) is used. With a liquid after flush, chemicals usually are added to aid in removing treating fluids from the formation, restoring water wettability to formation solids and precipitated acid reaction products, and prevention of emulsion formation. A glycol ether mutual solvent has been shown to be useful for this purpose. When a gas is used as an afterflush, cleanup additives are added to the HF-HCl stage of the treatment.

In an effort to remove damage completely, whether originally present or induced by the acid, one may decide to try a larger acid volume. Aside from the additional cost, there is a physical limitation on the quantify of acid the formation can tolerate without becoming unconsolidated. Recall that the acid is dissolving the cementing material; therefore, as acid is injected, the formation progressively becomes weaker until it finally disintegrates.

If simulated overburden stresses are imposed on a core during acidation, a point is soon reached where the compressive strength of the core is inadequate to support the load and the core recompacts to a lower porosity and permeability. The progressive improvement is permeability with acid throughout reverses once sufficient acid has been injected to remove consolidating material from the sand.

In a carbonate matrix acidizing treatment, the acid used (usually hydrochloric acid) is injected at a pressure (and rate) low enough to prevent formation fracturing. Again, the goal of the treatment is to create dominant wormholes which penetrate through the near wellbore damaged area The treatment usually involves acid injection followed by a sufficient afterflush of water or hydrocarbon to clear all acid from well tubular goods. A corrosion inhibitor is added to the acid to protect wellbore tubulars. Other additives, such as antisludge agents, iron chelating agents, de-emulsifiers, and mutual solvents, are added as required for a specific formation.

When acid is pumped into a carbonate (limestone or dolomite) formation at pressures below the fracture pressure, the acid flows preferentially into the highest permeability regions (that is, largest pores, vugs or natural fractures). Acid reaction in the high-permeability region causes the formation of large, highly conductive flow channels called wormholes. The creation of wormholes is related to the rate of chemical reaction of the acid with the rock. High reaction rates, as observed between all concentrations of HCl and carbonates, tend to favor wormhole formation. Acids normally used in field treatments are highly reactive at reservoir conditions and tend to form a limited number of wormholes. A low reaction rate favors the formation of several small-diameter wormholes.

The productivity increase that can result from a matrix acid treatment in carbonate normally is limited to bypassing the damage zone, retarding the acid by forming an emulsion of the acid or in other ways increasing the effective viscosity of the acidic fluid in order to achieve deeper acid penetration. The maximum stimulation expected from a matrix treatment will be about 1.5-fold above damage removal. The exact stimulation ratio from matrix acidizing of a carbonate cannot be predicted because the number and location of wormholes cannot be predicted.

Because wormhole length normally is a function of injection rate and acid reaction rate, comparable stimulation ratios can be achieved by adjusting the injection rate when using different acids, for example, organic acids, hydrochloric acid, acid mixtures and chemically retarded acids. A viscous, emulsified acid is preferred because it allows some control over the rate at which acid reacts with the formation rock. In low-permeability formations, however, it often is not feasible to use these acids because of their low infectivity. In these formations, 28-percent HCl normally is preferred. If hydrochloric acid cannot be effectively inhibited to limit corrosion at formation temperature, formic acid is preferred, although acetic acid could be used.

The following are some of the known methods of acidizing hydrocarbon bearing formations which can be used as part of the present method: U.S. Pat. Nos. 3,215,199 to R. E. Dilgen; 3,297,090 to R. E. Dilgren; 3,307,630 to R. E. Dilgren et al.; 2,863,832 to R. L. Perrine; 2,910,436 to L. Fatt et al.; 3,251,415 to C. C. Bombardieri; 3,441,085 to J. L. Gidley; and 3,451,818 to J. L. Gidley et al., which are hereby incorporated by reference. These methods are modified to incorporate the separate step for selectively blocking the pore structure in water zones prior to the acidizing step thereof, whether matrix acidizing or fracture acidizing.

EXAMPLES

Example 1: Limiting Inflow of Formation Water

A viscoelastic fluid is pumped through cores in parallel—a brine saturated core and a diesel saturated core which were prepared in similar fashion to those used in Example 3, Part I, Steps 1–9. Temperature indicators at the inlet and outlet record the temperature of the fluid entering and exiting the core. In addition to a pressure indicator at the core inlet, there are 5 pressure transducers which note the pressure at different sections of the core. The exiting fluid is collected in a balance to determine the weight of the fluid leakoff. Following the leakoff test, brine is passed through the cores and the leakoff is noted.

TABLE I

Test Conditions of the Fluid Loss Experiment

| | |
|---|---|
| Brine | 2% or 4% KCl or 3% NH$_4$Cl |
| Viscoelastic surfactant concentration[a] | 4–5% |
| Temperature | 150 psi |
| Pressure | 1000 psi |
| Permeability | 60 mD |
| Core Size | 6–12 in |
| Test time | 10–200 min |

[a]N-cis-13-docosenoic-N, N-bis (2-hydroxyethyl)-N-methyl ammonium chloride (QAS)

In matrix acidizing, the viscoelastic fluid (VF) is actually followed with acid and not brine. Tests were performance to study the effect of acid addition on the viscosity of the fluid.

Figure 8:
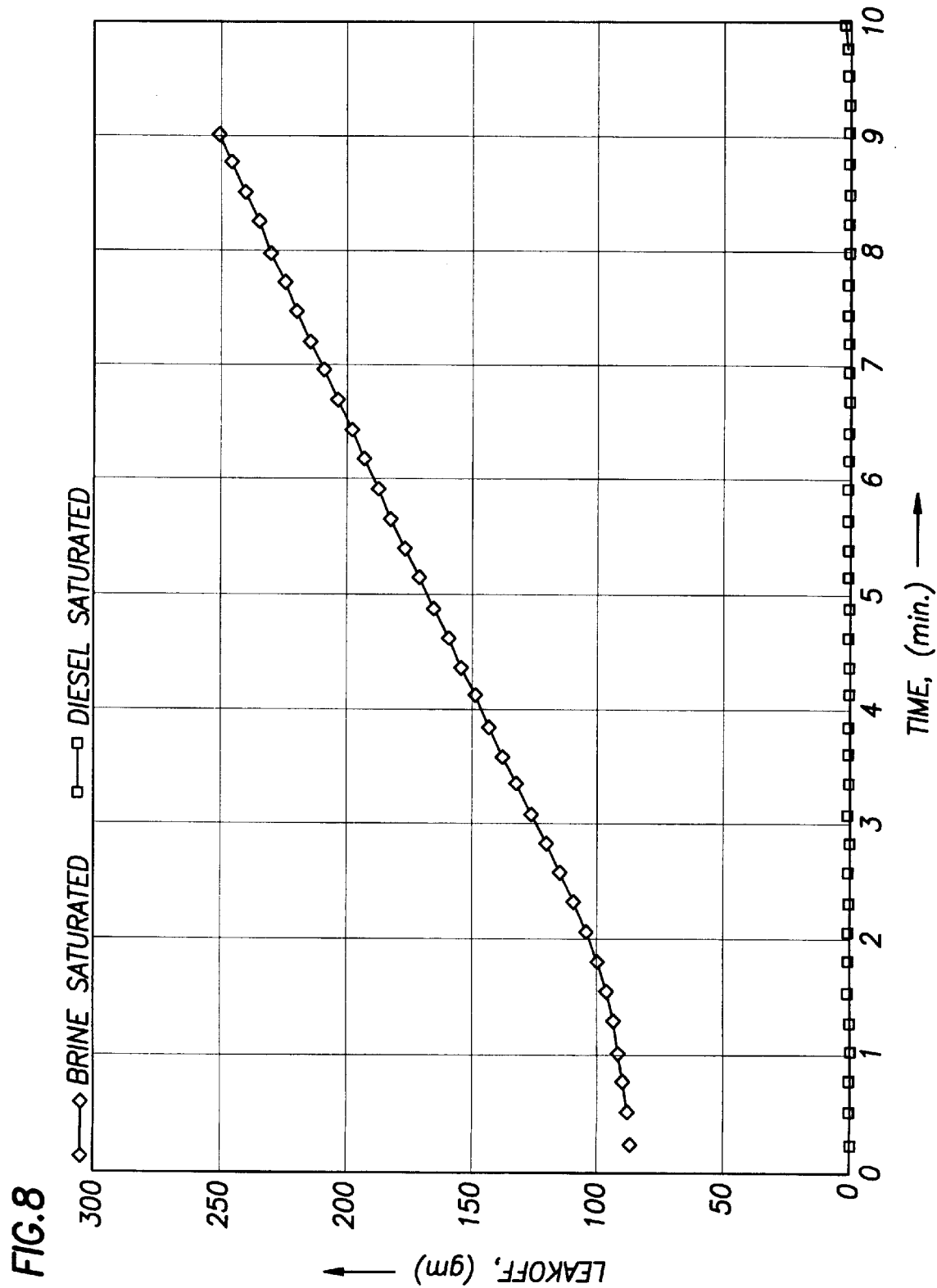
FIG. 8 presents a graph of the brine leakoff through a brine saturated core and a diesel saturated core after leakoff tests referred in FIGS. 7a and 7b.
Figure 9:
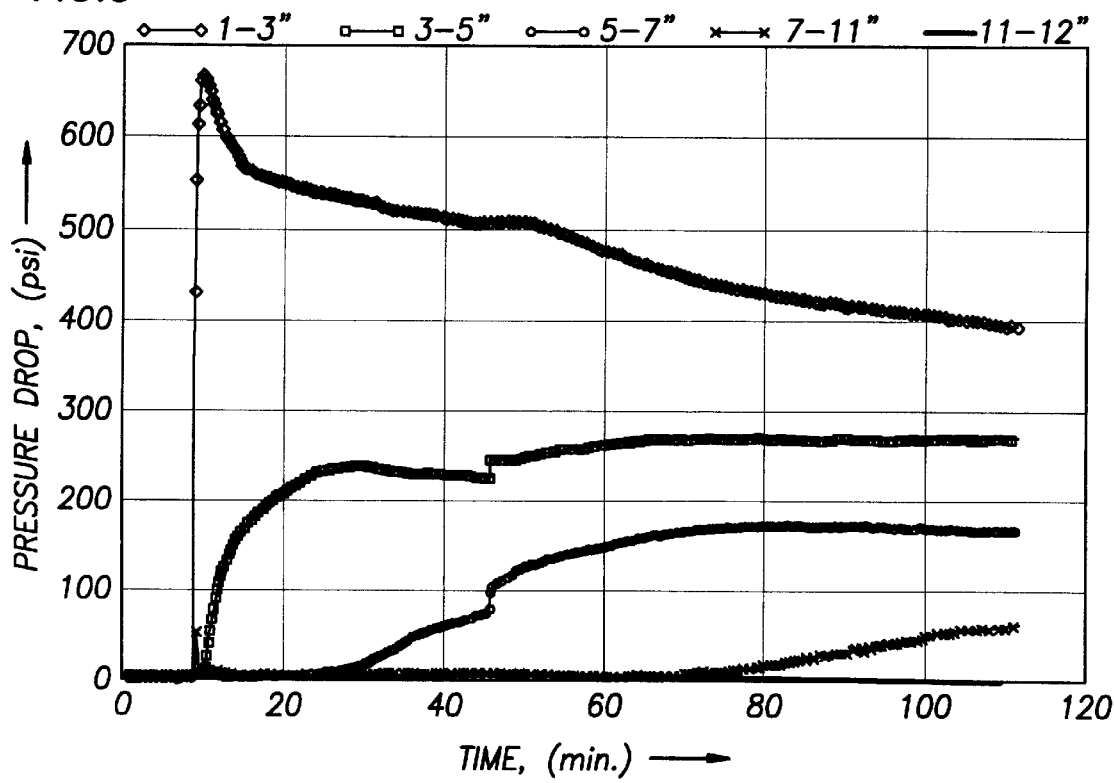
FIG. 9 presents a graph showing the pressure drop through different sections of the core between 1 " and 3", 3" and 5", 5" and 7", 7" and 11", and 11 " and 12" measured from the end where the fluid enters the core.
Figure 10:
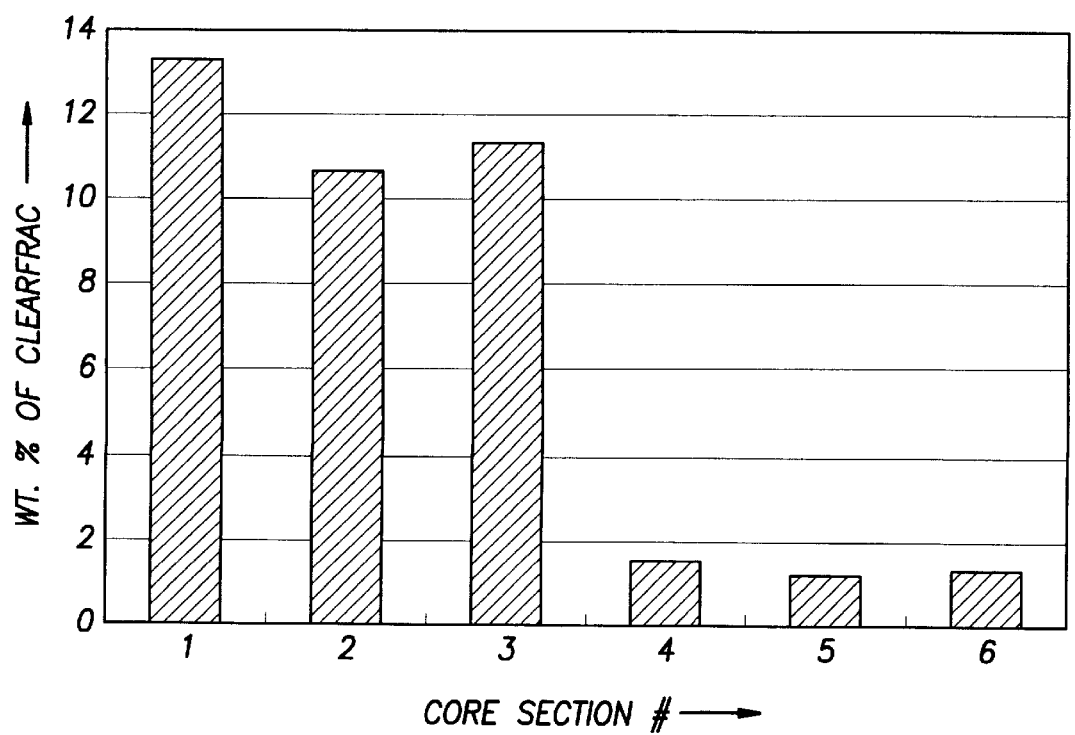
FIG. 10 presents a bar graph showing the concentration of the quaternary ammonium salt in each of the 2" sections of the 12" brine saturated core identified as section numbers 1 through 6 starting from the fluid entrance end of the core.

The rate as well as total leakoff is higher in the case of diesel cores than brine saturated cores (FIGS. 7a and 7b). This is because the micellar structure of VF is changed when it comes into contact with hydrocarbon, resulting in lower viscosity and higher leakoff. The leakoff test is followed by passing brine through the two cores. FIG. 8 gives the leakoff of brine in the two cores. The second part of the experiment consisted of noting the pressure drop in different sections of the brine saturated core (FIG. 9) and comparing it with the concentration of QAS found in that section of the core (FIG. 10). The concentration of QAS was determined according to Example 2. These two graphs indicated that there is a zone of high fluid viscosity (50–200 cP) in the first 6 inches of the 12-inch core resulting in higher pressure drops.

Another leakoff test was carried out for a shorter test time (FIG. 11). This was followed by passing tagged brine through both the cores (FIG. 12). There was a time lag (4 min) in the case of brine saturated core, with respect to leakoff, as compared to the oil saturated core. After this delay, the leakoff rate in brine saturated core was comparable to that in oil saturated core. This strengthens our hypothesis about the formation of a high-viscosity zone and also shows that viscosity developed in that section of the core is dependent on the duration of the test. In this case, since the test was carried out for less than 20 minutes, there was not enough time to form a high-viscosity zone and the zone formed may have been washed off with the incoming brine. Note that the delay in leakoff in the brine saturated core lasted longer than it takes to flow one pore volume through the oil saturated core.

Of the three acids studied (HCl, $H_2SO_4$, $HNO_3$), concentrated HCl was found to break VF, with 3% $NH_4Cl$ as the base brine. Hence, if HCl is used as the acidizing fluid, it will break the high viscosity zone. This can be avoided if VF is prepared in $NH_4NO_3$, instead of $NH_4Cl$.

These fluid loss experiments have given interesting results which suggest that a high viscosity zone is created in the initial 3 to 4 in of the brine-filled high-permeability core following passage of VF. This high viscosity zone will divert an aqueous treatment fluid away from the water zone and into the hydrocarbon zone in complex reservoirs.

Example 2: Extraction of QAS from Sandstone with Methanol

Extraction studies were also carried out on cores after the VF leakoff test. The core was cut into six 2-inch pieces and each piece was crushed and pulverized. The QAS concentration in each piece was estimated colormetrically after extraction in methanol. The procedure was as follows:

1. Cut the 12-inch core to get six (6) 2-inch core pieces and label it from entrance to exit with a pencil.
2. Crush the pieces into powder using a hydraulic press.
3. Separate sandstone powder from the chunks.
4. Crush the chunks again and mix with the rest of the powder and label it.
5. Do this for all the 6 fractions.
6. Take 20 grams of the powder in a bottle and save the rest.
7. Add 20 ml methanol to the 20 g powder and shake well for a minute.
8. Decant the liquid to a 50 mL centrifuge tube.
9. Continue extraction another 3 times with 10 ml methanol each time.
10. Pool the extracted methanol in the 50 mL centrifuge tube.
11. Centrifuge and transfer the clear methanol solution to another 50 mL centrifuge tube.
12. Place equal volumes (30 or 35 ml) of the six methanol extracts in a rack and place in a water bath. (Do not cover the bath with a lid). Swirl the solution gently (about every 30 min). The solution is concentrated to dryness.
13. Add 3+1+1 ml (a total of 5 ml per sample) water to the above centrifuge tube, vortex and transfer the solution to a beaker.
14. Concentrate that to about 0.5 ml on a hot plate at very low heat. (Care was taken to avoid burning the QAS. Otherwise, the double-bond may be oxidized to —COOH and cleave the molecule.)
15. Accurately measure and transfer the solution to a 1.5 ml centrifuge tube.
16. Add water to the beaker in small quantities (0.2 ml each time), wash out all the QAS and transfer it to the 1.5 ml centrifuge tube. The total volume should be exactly 1.5 ml.
17. Centrifuge the solution.
18. Take 0.5 ml of the clear solution and add that to 4.5 ml water (10 times dilution).
19. Use this solution for estimation of QAS concentration by colorimetric method using $KMnO_4$.

Example 3: Diversion of Acid Treatment Fluid from Higher Water Saturated to High Oil Saturated Formation Core flowing testing procedure Part I. Control: Without mutual solvent and brine spacer preflush 1. Two dry berea cores were weighed and then vacuum saturated with 3% $NH_4Cl$.
2. After the cores were saturated, they were weighed again so the pore volumes of these two cores could be calculated.
3. The cores were mounted into a dual-core device, which is capable of housing two 12" cores, and heated up to 150° F. No back pressure was applied except 20 inch long ⅛" diameter coil tubing was installed at the outlet of each of the two core holders to provide some back pressure.
4. Initial permeabilities of both cores to were determined by injecting 3% $NH_4Cl$.
5. Diesel was injected into core number one at 2 ml/min to displace the 3% $NH_4Cl$ out of the core. Injection continued until no more water was contained in the effluent.
6. Step 4 was repeated for core number two.
7. The cores were then at their irreducible water saturations. They were shut in for 12 to 18 hours.
8. After shut in, 3% $NH_4Cl$ brine was injected through core number one at 5 ml/min to displace diesel out of the core until residual oil saturation.
9. At this time, core number one was saturated with water at residual oil saturation, and core number two was saturated with oil at irreducible water saturation.
10. Four percent viscoelastic surfactant concentrate was mixed in 3% $NH_4Cl$ brine and was then injected into both cores simultaneously under a constant differential pressure of 520 psi for 60 minutes. Effluents from the cores were measured by electronic balances. The concentrate was 25% isopropyl alcohol and 75% N-cis-13-docosenoic-N,N-bis (2-ahydroxyethyl)-N-methylammonium chloride (aka N-methyl-N,N-bis (2-hydroxyethyl) erucylammonium chloride). This quatemary ammonium salt is available from AKZO Nobel Chemicals, Inc. and is derived from rape seed oil.
11. Viscoelastic surfactant concentrate was followed by 3% $NH_4Cl$ brine or 15% HCl brine injected into both cores simultaneously at 10 ml/min. When dissolved in a brine, these surfactant molecules group together to form unique micelles. The geometry of these micelles is similar to polymer molecules with a long rod shaped or worm-like structures. Effluent volume through each core was measured.

Results from this procedure are presented in FIG. 13. Part I of this example demonstrated that pumping the viscoelastic surfactant without a mutual solvent preflush does not divert the following treatment away from the area with the lowest oil concentration.

Part II. With mutual solvent and brine spacer preflush

The procedure for saturating cores was the same as the procedure described above from step 1 through 9. Thereafter, the procedure was as follows:

10. Before injecting the viscoelastic surfactant, 120 ml (approximately 2 overall pore volumes) of ethylene glycol monbutyl ether, a mutual solvent, was pumped through both cores simultaneously at 10 ml/min. Effluent volume through each core was measured.

11. The mutual solvent preflush was followed by a 120 ml NH$_4$Cl spacer preflush at 10 ml/min.

12. Four percent of the VF was mixed in 3% NH$_4$Cl brine and was then injected into both simultaneously under a constant differential pressure of 520 psi for 60 minutes. Effluents from the cores were measured by electronic balances.

13. VF was followed by 3% NH$_4$Cl brine or 15% HCl brine injected into both cores simultaneously at 10 ml/min. Effluent volume through each core was measured.

FIG. 14 shows that use of a mutual solvent preflush prior to the stage containing the viscoelastic surfactant results in excellent diversion of the acid stage into the area of highest oil concentration.

FIG. 15 shows that the sequence of mutual solvent followed by viscoelastic surfactant can divert subsequent water based treatments away from high permeability zone and into lower permeability zones of the same oil saturation.

FIG. 16 shows that the sequence of mutual solvent and then viscoelastic surfactant can divert acid treatment away from areas of low oil saturation into an area of high oil saturation.

What is claimed is:

1. A method of limiting the inflow of formation water during and after a well turn around to maximize polymer recovery after a hydraulic fracturing treatment of a formation having a hydrocarbon zone and a water-bearing zone, the method comprising:

step for selectively blocking the pore structure in the water-bearing zone at the formation face and not blocking the pore structure of the hydrocarbon zone at the formation face;

performing a hydraulic fracturing treatment using a fluid having a polymer; and turning the well around to recover the polymer.

2. A method of limiting the inflow of formation water during and after a well turn around to maximize recovery of fracturing fluid and components thereof after a hydraulic fracturing treatment of a formation having a hydrocarbon zone and a water-bearing zone, the method comprising:

step for selectively blocking the pore structure in the water-bearing zone at the formation face and not blocking the pore structure of the hydrocarbon zone at the formation face;

performing a hydraulic fracturing treatment using the fracturing fluid capable of transporting a proppant into a fracture; and turning the well around to recover the fracturing fluid and components thereof.

3. The method of claim 2, wherein the viscous fluid has at least a viscoelastic surfactant capable of forming a worm-like micelle in an aqueous environment;

a water-soluble salt to effect formation stability; and an aqueous carrier fluid in which the viscoelastic surfactant forms the worm-like micelles.

4. The method of claim 3, wherein the viscoelastic surfactant is selected from the group consisting of:

(a) an amine having to the formula

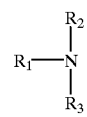

(b) an amine salt having the formula

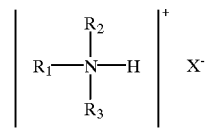

and
(c) a quaternary ammonium salt having the formula

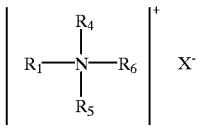

wherein
   $R_1$ is an aliphatic group having at least 16 carbon atoms which may be branched or straight chained and which may be saturated or unsaturated, $R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6- member ring which includes the nitrogen atom to which they are attached, $R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6- member ring which includes the nitrogen atom to which they are attached, and $X^-$ is an inorganic or organic anion.

5. The method of claim 2, wherein the viscous fluid is a water control material selected from the group consisting of a crosslinked cationic polyacrylamide, a crosslinked hydroxyethylcellulose, polymers and copolymers of N-vinyl amides, and chromium crosslinked carboxylate-containing polymers.

6. A method of acidizing a formation having a hydrocarbon zone and a water-bearing zone, the method comprising:

step for selectively blocking the pore structure in the water-bearing zone at the formation face to selectively retard migration of acid into the water-bearing zone and allow migration into the hydrocarbon zone; and injecting acid into the formation, wherein the acid is diverted from the water-bearing zone to the hydrocarbon zone as a result of selectively blocking the pore structure in the water-bearing zone at the formation face.

7. The method of claim 6, wherein the water-bearing zone contains a residual amount of hydrocarbon residues and the method further comprising injecting a mutual solvent prior to the step for selectively blocking.

8. The method of claim 7, wherein the mutual solvent is selected from the group consisting of low molecular weight esters, ethers and alcohols.

9. The method of claim 8, wherein the mutual solvent is a low molecular weight ether.

10. The method of claim 9, wherein the low molecular weight ether is ethylene glycol monobutyl ether.

11. The method of claim 6, wherein the acidizing method is a matrix acidizing method and the acid is a matrix acid.

12. The method of claim 6, wherein the step for selectively blocking forms a plug of a viscous fluid in the pore structure of the water-bearing zone at the formation face.

13. The method of claim 12, wherein the viscous fluid has at least
a viscoelastic surfactant capable of forming a worm-like micelle in an aqueous environment;
a water-soluble salt to effect formation stability; and
an aqueous carrier fluid in which the viscoelastic surfactant forms the worm-like micelles.

14. The method of claim 13, wherein the viscoelastic surfactant is selected from the group consisting of:

(a) an amine having to the formula

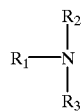

(b) an amine salt having the formula

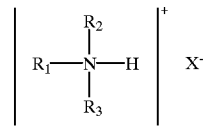

and
(c) a quaternary ammonium salt having the formula

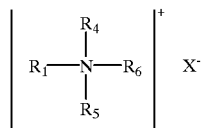

wherein
$R_1$ is an aliphatic group having at least 16 carbon atoms which may be branched or straight chained and which may be saturated or unsaturated,
$R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6- member ring which includes the nitrogen atom to which they are attached,
$R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6- member ring which includes the nitrogen atom to which they are attached, and
$X^-$ is an inorganic or organic anion.

15. The method of claim 12, wherein the viscous fluid is a water control material selected from the group consisting of a crosslinked cationic polyacrylamide, a crosslinked hydroxyethylcellulose, polymers and copolymers of N-vinyl amides, and chromium crosslinked carboxylate-containing polymers.

16. The method of claim 6, wherein the step for selectively blocking forms a plug of a viscous fluid in the pore structure of the water-bearing zone at the formation face.

17. The method of claim 16, wherein the viscous fluid has at least a viscoelastic surfactant capable of forming a worm-like micelle in an aqueous environment;
a water-soluble salt; and
an aqueous carrier fluid in which the viscoelastic surfactant forms the worm-like micelles.

18. The method of claim 17, wherein the viscoelastic surfactant is selected from the group consisting of:

(a) an amine having the formula

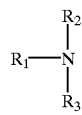

(b) an amine salt having the formula

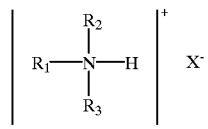

and
(c) a quaternary ammonium salt having the formula

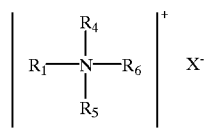

wherein
$R_1$ is an aliphatic group having at least 16 carbon atoms which may be branched or straight chained and which may be saturated or unsaturated,
$R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6-member ring which includes the nitrogen atom to which they are attached, $R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6-member ring which includes the nitrogen atom to which they are attached, and $X^-$ is an inorganic or organic anion.

19. A method of limiting the inflow of formation water during a matrix acidizing treatment of a formation having a hydrocarbon zone and a water-bearing zone, the method comprising step for selectively blocking the pore structure in the water-bearing zone at the formation face and not blocking the pore structure of the hydrocarbon zone at the formation face to divert the acid from the water-bearing zone to the hydrocarbon zone and performing a matrix acidizing treatment.

20. The method of claim 19, wherein the step for selectively blocking forms a plug of a viscous fluid in the pore structure of the water-bearing zone at the formation face.

21. The method of claim 20, wherein the viscous fluid has at least a viscoelastic surfactant capable of forming a worm-like micelle in an aqueous environment;

a water-soluble salt stability; and an aqueous carrier fluid in which the viscoelastic surfactant forms the worm-like micelles.

22. The method of claim 21, wherein the viscoelastic surfactant is selected from the group consisting of:

(a) an amine having the formula

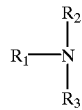

(b) an amine salt having the formula

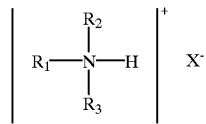

and (c) a quaternary ammonium salt having the formula

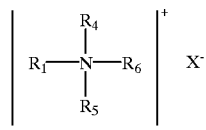

wherein $R_1$ is an aliphatic group having at least 16 carbon atoms which may be branched or straight chained and which may be saturated or unsaturated, $R_2$ and $R_3$ are each independently a hydrogen atom or an aliphatic group containing from 1 to about 6 carbon atoms and which can be branched or straight chained, saturated or unsaturated and which may be substituted with a group which renders $R_2$ and/or $R_3$ more hydrophilic and wherein $R_2$ and $R_3$ may be part of a 5- or 6-member ring which includes the nitrogen atom to which they are attached, $R_4$, $R_5$ and $R_6$ are each independently an aliphatic group containing from 1 to about 6 carbon atoms and which can be branched or straight chained, saturated or unsaturated and which may be substituted with a group which renders $R_2$ and/or $R_3$ more hydrophilic and wherein any two of $R_4$, $R_5$ and $R_6$ may be part of a 5- or 6-member ring which includes the nitrogen atom to which they are attached, and $X^-$ is an inorganic or organic anion.

* * * * *